United States Patent
Adachi

(10) Patent No.: US 10,615,854 B2
(45) Date of Patent: Apr. 7, 2020

(54) WIRELESS COMMUNICATION DEVICE, WIRELESS COMMUNICATION TERMINAL AND WIRELESS COMMUNICATION METHOD

(71) Applicants: KABUSHIKI KAISHA TOSHIBA, Minato-ku, Tokyo (JP); TOSHIBA ELECTRONIC DEVICES & STORAGE CORPORATION, Minato-ku, Tokyo (JP)

(72) Inventor: Tomoko Adachi, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 15/804,766

(22) Filed: Nov. 6, 2017

(65) Prior Publication Data
US 2018/0062713 A1   Mar. 1, 2018

Related U.S. Application Data

(63) Continuation of application No. PCT/JP2016/063504, filed on Apr. 28, 2016.

(30) Foreign Application Priority Data

May 7, 2015 (JP) .................. 2015-094715
May 12, 2015 (JP) .................. 2015-097748

(51) Int. Cl.
*H04B 7/0452* (2017.01)
*H04W 16/28* (2009.01)
(Continued)

(52) U.S. Cl.
CPC .......... *H04B 7/0452* (2013.01); *H04W 16/28* (2013.01); *H04W 72/04* (2013.01);
(Continued)

(58) Field of Classification Search
None
See application file for complete search history.

(56) References Cited

U.S. PATENT DOCUMENTS 7,440,432 B2   10/2008   Niiho et al.
8,107,993 B2    1/2012   Toshimitsu et al.
(Continued)

FOREIGN PATENT DOCUMENTS

JP   2003-061136 A   2/2003
JP   2004-320654 A   11/2004
(Continued)

OTHER PUBLICATIONS

Aboul-Magd, Osama: "802.11 HEW SG Proposed PAR", IEEE 802.11-14/0165r1, Huawei Technologies, Mar. 2014, pp. 1-6.
(Continued)

*Primary Examiner* — Robert M Morlan
(74) *Attorney, Agent, or Firm* — Foley & Lardner LLP

(57) ABSTRACT

According to one embodiment, a wireless communication device includes: a receiver configured to receive a plurality of first frames each including first information required for uplink multi-user transmission; and a transmitter configured to transmit a second frame generated on the basis of the first information included in the plurality of first frames. The transmitter does not transmit a transmission request for the first information before the first frames are received. The second frame is a frame instructing transmission of a third frame including data after a predetermined time from reception of the second frame.

22 Claims, 17 Drawing Sheets

(51) Int. Cl.
*H04W 72/04* (2009.01)
*H04W 84/12* (2009.01)
*H04B 7/06* (2006.01)
*H04W 88/02* (2009.01)

(52) U.S. Cl.
CPC ......... *H04W 72/044* (2013.01); *H04W 84/12* (2013.01); *H04B 7/0697* (2013.01); *H04W 88/02* (2013.01)

(56) References Cited

U.S. PATENT DOCUMENTS

| | | | |
|---|---|---|---|
| 9,642,144 | B2 | 5/2017 | You et al. |
| 9,686,071 | B2 | 6/2017 | Min et al. |
| 9,854,606 | B2 | 12/2017 | Seok |
| 9,894,641 | B2 | 2/2018 | Ding et al. |
| 9,900,871 | B1 | 2/2018 | Ryu et al. |
| 9,912,388 | B2 | 3/2018 | Chu et al. |
| 10,104,688 | B2 | 10/2018 | Seok |
| 10,230,498 | B2 | 3/2019 | Chandra et al. |
| 10,313,860 | B2 | 6/2019 | Montemurro et al. |
| 10,477,589 | B2 | 11/2019 | Ahn et al. |
| 2004/0228311 | A1 | 11/2004 | Sugaya et al. |
| 2006/0198332 | A1 | 9/2006 | Niiho et al. |
| 2009/0094506 | A1 | 4/2009 | Lakkis |
| 2010/0008318 | A1 | 1/2010 | Wentink et al. |
| 2011/0051647 | A1 | 3/2011 | Sampath et al. |
| 2012/0008572 | A1 | 1/2012 | Gong et al. |
| 2012/0060075 | A1 | 3/2012 | Gong et al. |
| 2013/0054729 | A1 | 2/2013 | Jaiswal et al. |
| 2013/0301569 | A1 | 11/2013 | Wang et al. |
| 2014/0126509 | A1 | 5/2014 | You |
| 2014/0269544 | A1* | 9/2014 | Zhu .................. H04L 1/1671 370/329 |
| 2015/0063111 | A1 | 3/2015 | Merlin et al. |
| 2015/0063258 | A1 | 3/2015 | Merlin et al. |
| 2015/0365940 | A1 | 12/2015 | Chu et al. |
| 2015/0382380 | A1 | 12/2015 | Li et al. |
| 2016/0113034 | A1 | 4/2016 | Seok |
| 2016/0345362 | A1 | 11/2016 | Lee et al. |
| 2016/0380746 | A1 | 12/2016 | Min et al. |
| 2017/0047972 | A1 | 2/2017 | Chu et al. |
| 2017/0086212 | A1* | 3/2017 | Kim .................. H04W 72/04 |
| 2017/0374655 | A1 | 12/2017 | Liu |
| 2018/0014334 | A1 | 1/2018 | Ahn et al. |
| 2018/0077723 | A1 | 3/2018 | Adachi |
| 2018/0124826 | A1 | 5/2018 | Seok |
| 2018/0145801 | A1* | 5/2018 | Wang .................. H04L 1/1614 |
| 2018/0167977 | A1 | 6/2018 | Li et al. |
| 2018/0198494 | A1 | 7/2018 | Chu et al. |
| 2018/0255422 | A1 | 9/2018 | Montemurro et al. |
| 2018/0332643 | A1 | 11/2018 | Liu et al. |
| 2019/0098483 | A1 | 3/2019 | Qi et al. |
| 2019/0274171 | A1 | 9/2019 | Viger et al. |

FOREIGN PATENT DOCUMENTS

| | | |
|---|---|---|
| JP | 2009-296374 A | 12/2009 |
| JP | 2010-130625 A | 6/2010 |
| JP | 2010-141660 A | 6/2010 |
| JP | 2011-501483 A | 1/2011 |
| JP | 2011-528218 A | 11/2011 |
| JP | 2014-239475 A | 12/2014 |
| JP | 2015-057712 A | 3/2015 |
| WO | WO-2011/038154 A1 | 3/2011 |
| WO | WO-2014/190290 A1 | 11/2014 |
| WO | WO-2015/025348 A1 | 2/2015 |
| WO | WO-2015/031440 A1 | 3/2015 |

OTHER PUBLICATIONS

Adachi, Tomoko: "Consideration on STA's Transmission Demands for UL MU", G90096686-1-096686_11-15-XXXX-00-00ax-consideration-on-stas-transmission, Toshiba, May 2015, pp. 1-12.
Adachi, Tomoko: "Consideration on STA's Transmission Demands for UL MU", G90096686-7-11-15-XXXX-00-00ax-consideration-on-stas-transmission, Toshiba, May 2015, pp. 1-12.
Adachi, Tomoko: "Consideration on STA's Transmission Demands for UL MU", G90097508-1-097508_11-15-XXXX-00-00ax-consideration-on-stas-transmission, Toshiba, May 2015, pp. 1-12.
Adachi, Tomoko: "Consideration on STA's Transmission Demands for UL MU", G90097508-7-11-15-XXXX-00-00ax-consideration-on-stas-transmission, Toshiba, May 2015, pp. 1-12.
Adachi, Tomoko: "Consideration on UL-MU Overheads", IEEE 802.11-15/0064r1, Toshiba, Jan. 2015, pp. 1-12.
Adachi, Tomoko: "Regarding Trigger Frame in UL MU", G90096686-10-11-15-XXXX-00-00ax-regarding-trigger-frame-in-ul-mu, Toshiba, May 2015, pp. 1-13.
Adachi, Tomoko: "Regarding Trigger Frame in UL MU", G90096686-3-096686_11-15-XXXX-00-00ax-regarding-trigger-frame-in-ul-mu, Toshiba, May 2015, pp. 1-11.
Adachi, Tomoko: "Regarding Trigger Frame in UL MU", G90097508-4-097508_11-15-XXXX-00-00ax-regarding-trigger-frame-in-ul-mu, Toshiba, May 2015, pp. 1-11.
Adachi, Tomoko: "Regarding Trigger Frame in UL MU", G90097508-9-11-15-XXXX-00-00ax-regarding-trigger-frame-in-ul-mu, Toshiba, May 2015, pp. 1-11.
IEEE Standards Association/IEEE Computer Society: "Part 11: Wireless LAN Medium Access Control (MAC) and Physical Layer (PHY) Specifications", IEEE Std 802.11™-2012, The Institute of Electrical and Electronics Engineers, Inc., Mar. 2012, pp. 1-2793.
IEEE Standards Association/IEEE Computer Society: "Part 11: Wireless LAN Medium Access Control (MAC) and Physical Layer (PHY) Specifications; Amendment 4: Enhancements for Very High Throughput for Operation in Bands Below 6 GHz", IEEE Std 802.11ac™-2013, The Institute of Electrical and Electronics Engineers, Inc., Dec. 2013, pp. 1-425.
Inoue et al.: "Beyond 802.11ac—A Very High Capacity WLAN", IEEE 11-13/0287r3, NTT, Mar. 2013, pp. 1-12.
Kwon et al.: "Issues on UL-OFDMA Transmission", IEEE 802.11-14/1431r0, Nov. 3, 2014 <URL> https://mentor.ieee.org/802.11/dcn/14/11-14-1431-00-00ax-issues-on-ul-ofdma.pptx, (Newracom, Sep. 2014), pp. 1-19.
Merlin et al.: "Multi-STA Acknowledgment", IEEE 802.11-15/0366r0, Qualcomm, Mar. 2015, pp. 1-17.
Merlin et al.: "Multi-STA Acknowledgment", IEEE 802.11-15/0366r1, Qualcomm, Mar. 2015, pp. 1-17.
Merlin et al.: "Multi-STA Acknowledgment", IEEE 11-15-0366-02-00ax-multi-sta-ba, Qualcomm, Mar. 2015, pp. 1-17.
Ryu et al.: "UL MU Procedure", IEEE 802.11-15/0365r0, LG Electronics, Mar. 2015, pp. 1-16.
Stacey, Robert: "Specification Framework for TGax", IEEE 802.11-15/0132r2, Intel, Jan. 2015, pp. 1-3.
Tandai, Tomoya: "Proposal of a Transmission Procedure of the Uplink Multiuser MIMO in IEEE 802.11 WLANs", Proceedings of the 2009 IEICE General Conference Tsushin 1, Mar. 17, 2009, p. 539, B-5-106, and its English translation thereof, 3 pgs.
Tran Thi Thao Nguyen et al.: "Uplink Multi-User MAC Protocol for 11ax", IEEE 11-14/0598r0 (11-14-0598-00-00ax-uplink-multi-user-mac-protocol-for-11ax), Kyushu Institute of Technology, May 2014, pp. 1-19.
U.S. Appl. No. 15/804,733, filed Nov. 6, 2017, Tomoko Adachi.
"3rd Generation Partnership Project; Technical Specification Group Radio Access Network; Evolved Universal Terrestrial Radio Access (E-UTRA); Medium Access Control (MAC) protocol specification (Release 12)", Mar. 2015.
Texas Instruments: "TI Designs TM4C1294x Wi-Fi Enabled IoT Node", Sep. 2014.
Non-Final Office Action on U.S. Appl. No. 15/804,733 dated Dec. 13, 2018.
Final Office Action on U.S. Appl. No. 15/804,733 dated Jul. 12, 2019.
"Information technology—Telecommunications and information exchange between systems Local and metropolitan area networks—Specific requirements Part 11: Wireless LAN Medium Access Control (MAC) and Physical Layer (PHY) Specifications; ISO/IEC/IEEE 8802-11:2012(E) (Revision of ISO/IEC/IEEE 8802-10-

(56) References Cited

OTHER PUBLICATIONS

2005", IEEE Standard, IEEE, Piscataway, NJ, USA, Nov. 22, 2012 (Nov. 22, 2012), pp. 1-2798, XP068045704, ISBN: 978-0-7381-8007-6.
Notice of Allowance issued on U.S. Appl. No. 15/804,733 dated Dec. 9, 2019.

* cited by examiner

WIRELESS COMMUNICATION DEVICE, WIRELESS COMMUNICATION TERMINAL AND WIRELESS COMMUNICATION METHOD

CROSS-REFERENCE TO RELATED APPLICATIONS

The present application is a Continuation of International Application No. PCT/JP2016/063504, filed on Apr. 28, 2016, the entire contents of which is hereby incorporated by reference.

FIELD

Embodiments of the present invention relate to a wireless communication device, a wireless communication terminal and a wireless communication method.

BACKGROUND

A communication scheme called OFDMA (Orthogonal Frequency Division Multiple Access) where transmissions to a plurality of wireless communication terminals (hereinafter referred to as terminals) or receptions from a plurality of terminals are simultaneously performed is known. Particularly, OFDMA where one or a plurality of subcarriers is assigned to a terminal as a resource block and the transmissions to the plurality of terminals or the receptions from the plurality of terminals are simultaneously performed on the resource block basis is also called resource-block-based OFDMA. The simultaneous transmissions from a base station to the plurality of terminals correspond to downlink OFDMA transmission and the simultaneous transmissions from the plurality of terminals to the base station correspond to uplink-OFDMA transmission.

A communication scheme called uplink multiuser MIMO (Multiple-Input Multiple-Output) is known where streams are transmitted from the plurality of terminals to the base station by spatial multiplexing (simultaneously by the same frequency band), and the base station simultaneously receives these streams by a plurality of antennas. Moreover, a scheme called downlink multiuser MIMO where the streams are transmitted from the base station to the plurality of terminals by spatial multiplexing (simultaneously by the same frequency band) and each terminal receiving each stream transmitted to itself is also known.

When uplink OFDMA (UL-OFDMA) or the uplink multiuser MIMO (UL-MU-MIMO: Uplink Multi-User MU-MIMO) communication is to be performed, it may be considered that a base station transmits a trigger frame in order to align the uplink transmission timings of each terminal. By each of the terminals performing transmission after certain time from the reception of the trigger frame, the transmission timings are aligned whereby the uplink multiple transmission (UL-OFDM or UL-MU-MIMO) is realized. Before the transmission of the trigger frame, scheduling including determination of matters required for uplink multiple transmission such as selection of terminals to be targets of the UL-OFDMA or UL-MU-MIMO or parameter information of the transmission is needed, but since the resource of the communication is limited, the scheduling which can improve system efficiency as much as possible is in demand. If a terminal not having data to be transmitted is selected as a target terminal, for example, the communication resources assigned to the terminal are not effectively used in an uplink transmission period, and it is likely that the system efficiency degrades. Moreover, if a base station tries to collect information from each terminal in advance in order to efficiently determine the required matters, processing at the base station becomes complicated, and if a collection period gets longer, it is likely that the system efficiency degrades.

DETAILED DESCRIPTION

According to one embodiment, a wireless communication device includes: a receiver configured to receive a plurality of first frames each including first information required for uplink multi-user transmission; and a transmitter configured to transmit a second frame generated on the basis of the first information included in the plurality of first frames. The transmitter does not transmit a transmission request for the first information before the first frames are received. The second frame is a frame instructing transmission of a third frame including data after a predetermined time from reception of the second frame.

Hereinafter, embodiments of the present invention will be described with reference to the drawings. The entire contents of IEEE Std 802.11-2012 and IEEE Std 802.11ac-2013, known as the wireless LAN standard and IEEE 802.11-15/0132r15 which is a specification framework document directed to IEEE Std 802.11ax as a next generation wireless LAN standard are herein incorporated by reference in the present specification.

(First Embodiment)

Figure 1:
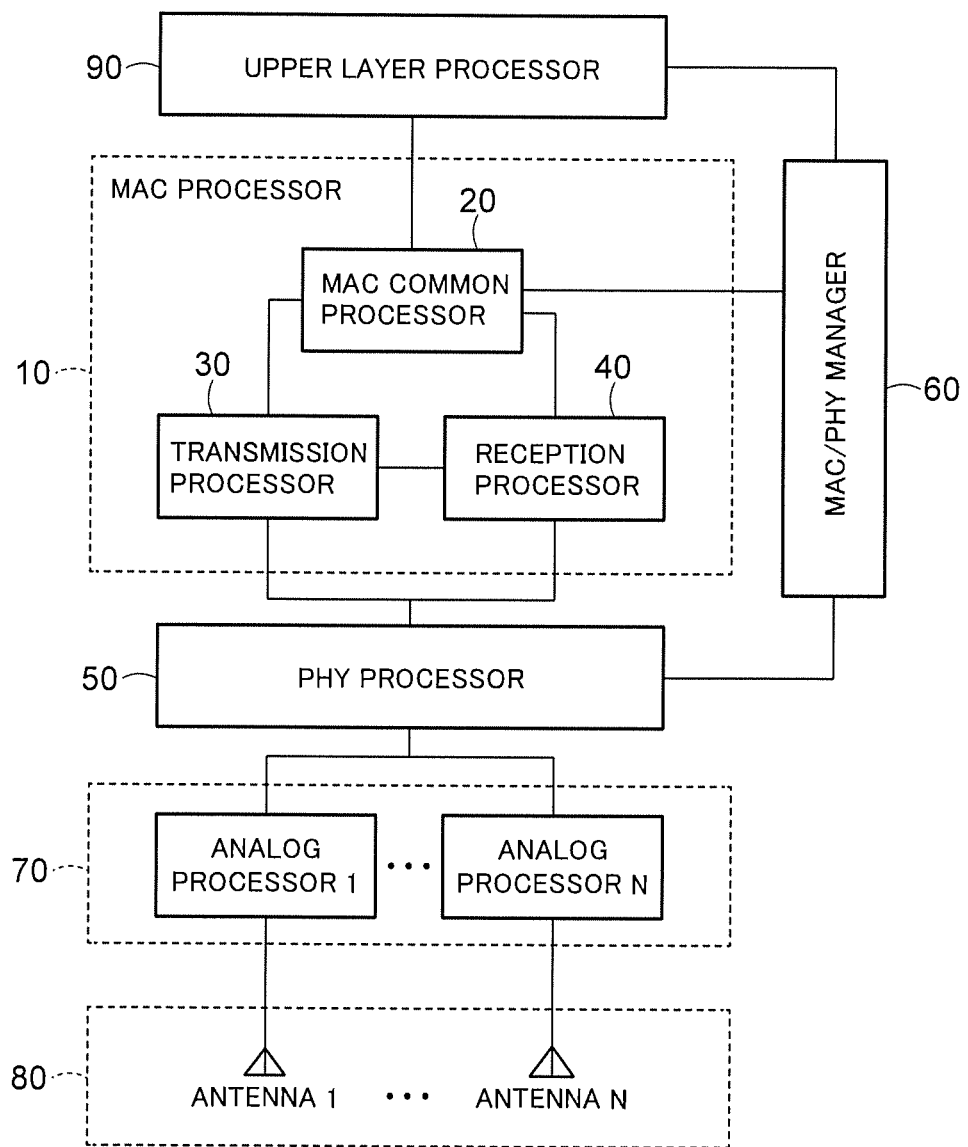
FIG. 1 is a functional block diagram of a wireless communication device according to an embodiment of the present invention.

A functional block diagram of a wireless communication device according to the first embodiment is illustrated in FIG. 1. This wireless communication device can be implemented in a wireless communication base station (hereinafter referred to as a base station) or in a wireless communication terminal (hereinafter referred to as a terminal) that communicates with the wireless communication base station. The base station can be considered as one mode of the terminal since it is different from the terminal in a point that it mainly has a relay function but has communication functions basically similar to the terminal in the other points. When a terminal is mentioned in the following explanations, it may refer to a base station as long as the terminal and the base station need not to be particularly discriminated from each other.

In this embodiment, such a case is assumed that uplink multiuser (UL-MU) transmission of at least either one of uplink MU-MIMO (UL-MU-MIMO: Uplink Multi-User MU-MIMO) or uplink OFDMA (UL-OFDMA: Orthogonal Frequency Division Multiple Access) is performed. The base station and the terminal may have capability of not only the UL-MU (UL-MU-MIMO or UL-OFDMA) but also downlink multiuser (DL-MU) transmission of at least either one of downlink MU-MIMO (DL-MU-MIMO) or downlink OFDMA (DL-OFDMA). The UL-MU transmission corresponds to uplink multi-user transmission, while the DL-MU transmission corresponds to downlink multi-user transmission. As the UL-MU transmission, a communication scheme combining the UL-MU-MIMO and the UL-OFDMA is also applicable and as the DL-MU transmission, a communication scheme combining the DL-MU-MIMO and DL-OFDMA is also applicable.

Figure 2:
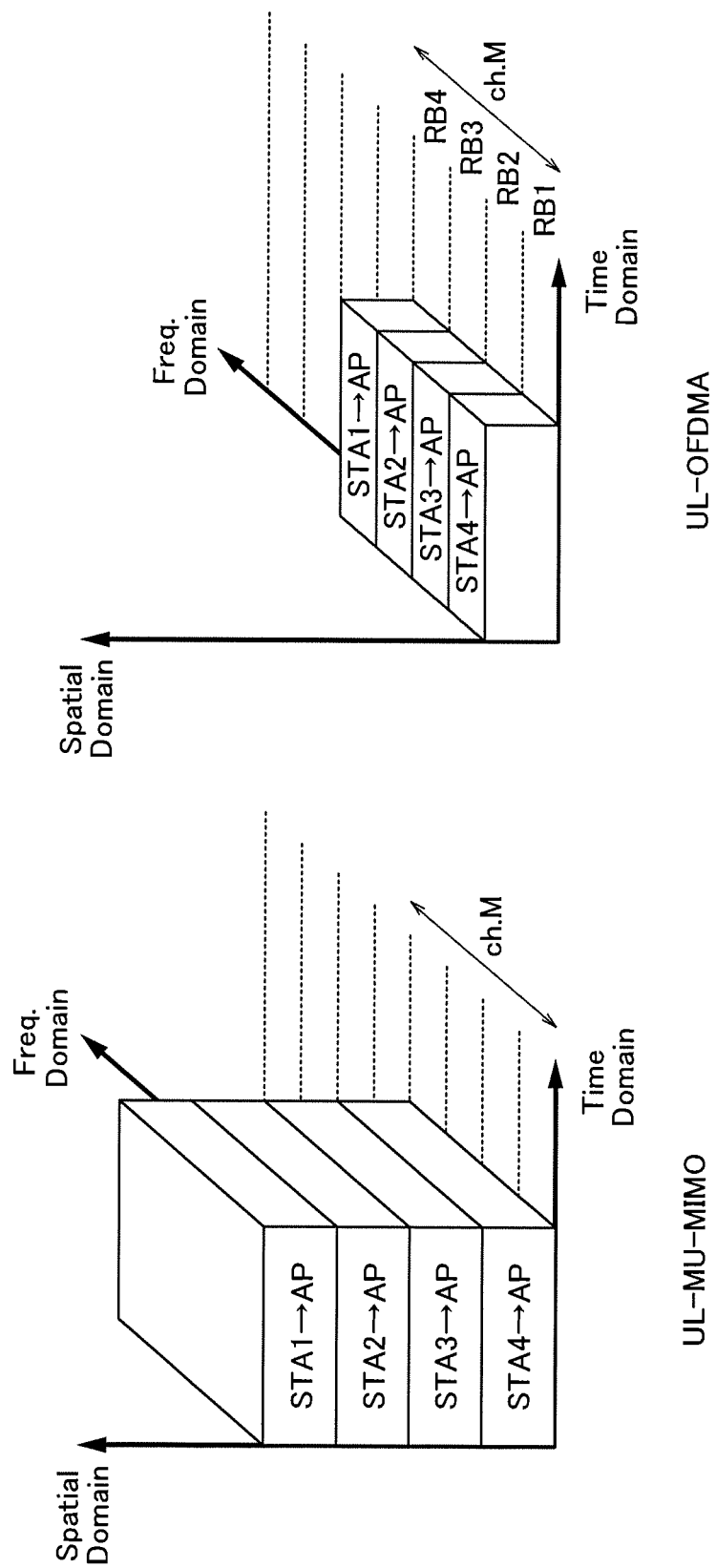
FIGS. 2A and 2B are diagrams explaining an outline of UL-MU-MIMO transmission and UL-OFDMA transmission.

FIG. 2A illustrates an outline of the UL-MU-MIMO transmission. In the UL-MU-MIMO transmission, the data stream (hereinafter referred to as stream) is transmitted by spatial multiplexing (simultaneously by the same frequency band) from a plurality of the terminals to the base station, and the base station receives these streams simultaneously by a plurality of antennas. In the illustrated example, the plurality of terminals 1 to 4 (STA1 to STA4) transmits the stream simultaneously by the same frequency band having a width of one channel (here, it is described as a channel M) to an access point (AP) which is the base station, that is, transmits by spatial multiplexing. The access point simultaneously receives these streams and MIMO-demodulates them so as to separate them into a frame for each terminal.

In the UL-MU-MIMO transmission, since the frame can be transmitted simultaneously from the plurality of terminals, the system throughput can be improved. The maximum number of data streams capable of multiplexing the UL-MU-MIMO transmission is limited by the number of antennas of the access point. As an example, when the access point has four antennas, the maximum number of streams capable of multiplexing is four. When each terminal includes one antenna, each can transmit only one stream, respectively. It is also possible to transmit a plurality of streams by providing a plurality of antennas in one terminal. In the case of DL-MU-MIMO, a difference is that a communication direction is a direction toward each terminal from the access point. In the DL-MU-MIMO, the stream is transmitted by spatial multiplexing (simultaneously by the same frequency band) to the plurality of terminals from the base station, and each terminal receives the stream destined to the terminal itself and decodes it.

FIG. 2B illustrates an outline of the UL-OFDMA transmission. In the UL-OFDMA, one or a plurality of subcarriers is assigned as a resource block (may also be called a sub channel, a resource unit, or a frequency block) to each terminal, and receptions from the plurality of terminals are performed simultaneously on the resource block basis. In the illustrated example, the resource block having one or a plurality of continuous subcarriers in continuous frequency domains in one channel (here, described as the channel M) as a unit is assigned to the terminal, respectively, and the receptions are performed simultaneously from the plurality of terminals. In more detail, the access point (AP) assigns four resource blocks (RB) 1 to 4 included in one channel to plurality of terminals 1 to 4 (STA1 to 4), respectively, and the plurality of terminals 1 to 4 performs transmissions simultaneously by the resource blocks assigned, respectively. As a result, the UL-OFDMA transmission is performed from terminals 1 to 4 to the base station. The resource blocks assigned to each of the terminals are different from each other and do not overlap with each other. In the case of DL-OFDMA, a difference is that a communication direction is the direction toward each terminal from the access point. In the DL-OFDMA, one or a plurality of subcarriers is assigned as the resource block to each terminal, and the transmission is performed simultaneously to the plurality of terminals from the access point on the resource block basis.

Figure 3:
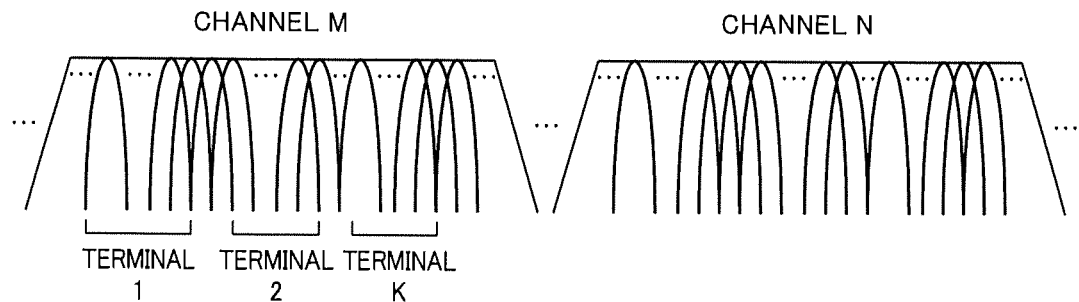
FIG. 3 is a diagram explaining OFDMA communication and allocation of a resource block.

The OFDMA will be explained in more detail. FIG. 3 illustrates a state where a plurality of channels is arranged in a frequency domain. A guard band is provided between the channels. A band width of one channel is 20 MHz, for example. A case where the OFDMA communication is conducted by using continuous bands of one channel among them (here, the channel M) corresponds to FIG. 2B. In the continuous bands of the channel M (a band with a width of 20 MHz, for example), a plurality of subcarriers (52 subcarriers, for example, in the case of 20 MHz band) orthogonal to each other is arranged, and the resource block with one or a plurality of continuous subcarriers as one unit is assigned to terminal 1, terminal 2, . . . terminal K (K is an integer of 2 or more. In the example in FIG. 2B, K=4) on the basis of these subcarriers.

The bandwidth of each resource block (or the number of subcarriers) is assumed to be common to each resource block, but different bandwidths (or subcarrier numbers) may be allowed for each resource block. Moreover, regarding the number of resource blocks to be assigned to each terminal, it is not limited to one resource block per one terminal but a plurality of resource blocks may be assigned to one terminal or the number of resource blocks to be assigned to each terminal may be different. If the resource block is constituted by a plurality of subcarriers, arrangement of each subcarrier included in the resource block may be continuous or discontinuous. A plurality of subcarriers arranged discontinuously may be assigned as the resource block to one terminal.

In the example in FIG. 3, at least one subcarrier is arranged as a guard subcarrier between the resource blocks to be assigned to each terminal. The number of the guard subcarriers to be arranged between the resource blocks may be determined in advance by the system or specification or may be determined arbitrarily. Moreover, arrangement of the guard subcarrier between the resource blocks may be not indispensable and non-arrangement of the guard subcarrier between the resource blocks may be allowed.

Moreover, the number of channels used in the OFDMA communication is not limited to 1, but two or more channels may be used for performing the OFDMA communication. At this time, independently for each channel, the resource blocks may be assigned in each channel as described above. At this time, assignment of a plurality of resource blocks belonging to different channels to one terminal may be allowed. Alternatively, instead of the assignment of the resource blocks independently for each channel, a continuous frequency domain being a plurality of channels bonded may be defined, and the resource blocks may be assigned in the frequency domain after the bonding. For example, a frequency domain of 40 MHz may be defined by connecting two channels each having a width of 20 MHz and adjacent to each other in terms of the frequency, the resource blocks may be assigned on the basis of subcarrier groups orthogonal to each other in the frequency domain of 40 MHz. Similarly, a frequency domain of 80 MHz by connecting four channels or a frequency domain of 160 MHz by connecting eight channels, each channel having a width of 20 MHz, may be defined. In this case, the resource blocks only need to be assigned on the basis of the subcarrier groups orthogonal to each other in the respective frequency domains.

It is assumed here that a terminal that implements OFDMA is capable of carrying out reception and decoding (including decoding of error correcting code and demodulation etc.) of a physical packet including a frame on a channel of at least the basic channel width (20 MHz channel width if IEEE 802.11a/b/g/n/ac standard-compliant terminal is regarded as a legacy terminal) at the legacy terminal that is to be backward compatible. At this time, with regard to the carrier sense, it is carried out in a unit of the channel. The carrier sense may encompass both physical carrier sense associated with busy/idle of CCA (Clear Channel Assessment) and virtual carrier sense based on medium reservation time described in the received frame. As in the case of the latter, a scheme for virtually determining that a medium is in the busy state, or the period during which the medium is virtually regarded as being in the busy state is called a Network Allocation Vector (NAV). The carrier sense information based on CCA or NAV carried out in a unit of a channel may be universally applied to all the resource blocks within the channel. For example, resource blocks belonging to the channel indicated as being in the idle state by the carrier sense information may be processed by universally applying the carrier sense information of the channel as being in the idle state. The terminal according to this embodiment is not limited to a terminal performing the carrier sense by a unit of a channel, but performance of the carrier sense (both in physical and virtual senses) by a unit of a resource block may be allowed as long as a scheme for performing the carrier sense by a unit of a resource block is implemented in the terminal.

With regard to OFDMA, channel-based OFDMA is also possible in addition to the above-described resource-block-based OFDMA. OFDMA of this case may in particular be called MU-MC (Multi-User Multi-Channel). In MU-MC, a base station assigns a plurality of channels to a plurality of terminals, and the plurality of channels are simultaneously used to carry out simultaneous transmissions to the plurality of terminals or simultaneous receptions from the plurality of terminals. The OFDMA of this embodiment which will be described below means the resource-block-based OFDMA: however, an embodiment of channel-based OFDMA can also be implemented with appropriate replacement of terms and phrases in conformity with the channel-based OFDMA in the following explanations such as reading the "resource block" as the "channel".

A communication scheme (which is called OFDMA & MU-MIMO) that combines OFDMA and MU-MIMO is also possible. In this communication scheme, a plurality of resource blocks is assigned to a plurality of terminals, respectively, and transmission of MU-MIMO by a unit of a resource block is performed simultaneously in each of the plurality of resource blocks. Both uplink OFDMA & MU-MIMO and downlink OFDMA & MU-MIMO are possible. When OFDMA or MU-MIMO is mentioned in the following explanations, it may be read as OFDMA & MU-MIMO.

In the following explanations, a terminal having the capability of performing at least either one of UL-OFDMA or UL-MU-MIMO may be called an UL-MU terminal. A terminal that does not have the capability may be called a legacy terminal. If the capability of performing UL-MU communication can be selectively enabled or disabled, a terminal whose capability is enabled may be considered as an UL-MU terminal. The UL-MU terminal may further include a capability of performing at least either one of DL-OFDMA or DL-MU-MIMO. Moreover, a terminal designated by the base station as a target of UL-MU communication this time in the UL-MU terminals corresponds to an UL-MU target terminal, while the terminal not designated by the base station as a target of UL-MU this time corresponds to an UL-MU non-target terminal.

As illustrated in FIG. 1, a wireless communication device incorporated in a terminal (which may be either a terminal of non-base station or the base station) includes upper layer processor 90, MAC processor 10, physical (PHY) processor 50, MAC/PHY manager 60, analog processor 70 (analog processors 1 to N), and antenna 80 (antennas 1 to N), where N represents an integer equal to or larger than 1. In the figure, the N analog processors and the N antennas are connected in pairs with each other, but the configuration is not limited to the illustrated one. For example, one analog processor and two or more antennas may be connected to this analog processor in a shared manner.

MAC processor 10, MAC/PHY manager 60, and PHY processor 50 correspond to a mode of a communication processing device or baseband integrated circuit that carries out processing associated with communications with other terminals (including the base station). Analog processor 70 corresponds, for example, to a wireless communication unit or a radio frequency (RF) integrated circuit that transmits and receives signals via antenna 80. The integrated circuit for wireless communication in accordance with this embodiment may include at least the former of the baseband integrated circuit (communication processing device) and the RF integrated circuit. The functions of the communication processing device or the baseband integrated circuit may be performed by software (programs) that runs on a processor such as a CPU or may be performed by hardware, or may be performed by both of the software and the hardware. The software may be stored in a storage medium such as a memory device including a ROM, a RAM, etc., a hard disk, or an SSD and read therefrom to be executed. The memory device may be a volatile memory device such as a DRAM, or a non-volatile memory device such as a NAND or an MRAM.

Upper layer processor 90 is configured to carry out processing for the Medium Access Control (MAC) layer associated with the upper layer or layers. Upper layer processor 90 is capable of exchanging signals with MAC processor 10. As the upper layer, TCP/IP, UDP/IP, and the application layer upper than these two protocols may be mentioned as typical examples but this embodiment is not limited to them. Upper layer processor 90 may include a buffer for exchanging data between the MAC layer and the upper layer or layers. It may also be considered that it may be connectable to a wired infrastructure via upper layer processor 90. The buffer may be a memory device, an SSD drive, or a hard disk. When the buffer is a memory device, the memory device may be a volatile memory device such as a DRAM, or a non-volatile memory device such as a NAND or an MRAM.

MAC processor 10 is configured to carry out processing for the MAC layer. As described above, MAC processor 10 is capable of exchanging signals with upper layer processor 90. Further, MAC processor 10 is capable of exchanging signals with PHY processor 50. MAC processor 10 includes MAC common processor 20, transmission processor 30, and reception processor 40.

MAC common processor 20 is configured to carry out common processing for transmission and reception in the MAC layer. MAC common processor 20 is connected to and exchanges signals with upper layer processor 90, transmission processor 30, reception processor 40, and MAC/PHY manager 60.

Transmission processor 30 and reception processor 40 are connected to each other. Also, transmission processor 30 and reception processor 40 are each connected to MAC common processor 20 and PHY processor 50. Transmission processor 30 is configured to carry out transmission processing in the MAC layer. Reception processor 40 is configured to carry out reception processing in the MAC layer.

PHY processor 50 is configured to carry out processing for a physical layer (PHY layer). As described above, PHY processor 50 is capable of exchanging signals with MAC processor 10. PHY processor 50 is connected via analog processor 70 to antenna 80.

MAC/PHY manager 60 is connected to upper layer processor 90, MAC processor 10 (more specifically, MAC common processor 20), and PHY processor 50. MAC/PHY manager 60 is configured to manage MAC operation and PHY operation in the wireless communication device.

Analog processor 70 includes an analog-to-digital and digital-to-analog (AD/DA) converter and a radio frequency (RF) circuit. Analog processor 70 is configured to convert a digital signal from PHY processor 50 into an analog signal having a desired frequency and transmit it from antenna 80, or convert a high-frequency analog signal received from antenna 80 into a digital signal. It is considered here that although AD/DA conversion is carried out by analog processor 70, another configuration is also possible according to which PHY processor 50 has the AD/DA conversion function.

The wireless communication device in accordance with this embodiment has its constituent element (i.e., incorporates) antenna 80 in one single chip and thereby makes it possible to reduce the mounting area of antenna 80. Further, in the wireless communication device in accordance with this embodiment, as illustrated in FIG. 1, transmission processor 30 and reception processor 40 shares the N antennas 80. By virtue of sharing the N antennas 80 by transmission processor 30 and reception processor 40, it is made possible to reduce the size of the wireless communication device of FIG. 1. It is considered here that the wireless communication device in accordance with this embodiment may have a configuration different than the one depicted by way of example in FIG. 1.

In reception of a signal from a wireless medium, analog processor 70 converts an analog signal received by antenna 80 into a baseband signal that can be processed by PHY processor 50, and further converts the baseband signal into a digital signal. PHY processor 50 is configured to receive a digital signal that is received from analog processor 70 and detect its reception level. The detected reception level is compared with the carrier sense level (threshold). When the reception level is equal to or larger than the carrier sense level, PHY processor 50 outputs a signal indicative of the fact that the medium (CCA: Clear Channel Assessment) is in the busy state to MAC processor 10 (reception processor 40 to be more precise). When the reception level is less than the carrier sense level, PHY processor 50 outputs a signal indicative of the fact that the medium (CCA) is in the idle state to MAC processor 10 (reception processor 40 to be more precise).

PHY processor 50 is configured to carry out decoding processing for the received signal (including decoding of error correcting code and demodulation etc.), processing of removing a physical header (PHY header) including a preamble, or the like, and extracts a payload. According to IEEE 802.11 standard, this payload is called physical layer convergence procedure (PLCP) service data unit (PSDU) on the PHY side. PHY processor 50 delivers the extracted payload to reception processor 40, and reception processor 40 handles it as a MAC frame. According to IEEE 802.11 standard, this MAC frame is called medium access control (MAC) protocol data unit (MPDU). In addition, PHY processor 50, when it started to receive the reception signal, notifies the fact of having started reception of the reception frame to reception processor 40, and, when it completed the reception of the reception signal, notifies the fact of having completed the reception to reception processor 40. Also, PHY processor 50, when the reception signal has been decoded successfully as the physical packet (PHY packet) (when it does not detect an error), notifies the completion of the reception of the reception signal and delivers a signal indicative of the fact that the medium is in the idle state to reception processor 40. PHY processor 50, when it detected an error in the reception signal, notifies the fact that the error has been detected with an appropriate error code in accordance with the error type to reception processor 40. Also, PHY processor 50, at the timing at which the medium has been determined to enter the idle state, notifies a signal indicative of the fact that the medium is in the idle state to reception processor 40.

MAC common processor 20 performs intermediary processing for delivery of transmission data from upper layer processor 90 to transmission processor 30 and for delivery of reception data from reception processor 40 to upper layer processor 90. According to IEEE 802.11 standard, the data in this MAC data frame is called medium access control (MAC) service data unit (MSDU). Also, MAC common processor 20 receives instructions from MAC/PHY manager 60 and then converts the instruction into appropriate form of instructions for transmission processor 30 and reception processor 40 and outputs the converted instructions to these units.

MAC/PHY manager 60 corresponds, for example, to station management entity (SME) in IEEE 802.11 standard. In that case, the interface between MAC/PHY manager 60 and MAC common processor 20 corresponds to MAC subLayer management entity service access point (MLME SAP) in IEEE 802.11 standard, and interface between MAC/PHY manager 60 and PHY processor 50 corresponds to physical layer management entity service access point (PLME SAP) in IEEE 802.11 wireless local area network (LAN).

It is considered here that although MAC/PHY manager 60 in FIG. 1 is illustrated on the assumption that the functional unit for the MAC management and the functional unit for the PHY management are configured to be integral with each other, these units may be separately implemented.

MAC/PHY manager 60 stores Management Information Base (MIB). The MIB stores various pieces of information such as the capability of the device itself and whether various functions are enabled or disabled. For example, information may be stored regarding whether or not the terminal itself supports UL-MU-compliant terminal and, if the device itself supports UL-MU-compliant terminal, whether or not the function to implement UL-MU is enabled or disabled. A memory device for storing and managing the MIB may be incorporated in MAC/PHY manager 60 or separately provided without being incorporated into MAC/PHY manager 60. When the memory device for storing and managing the MIB is provided separately from MAC/PHY manager 60, MAC/PHY manager 60 can refer to the separately provided memory device and rewrite rewritable parameters within the memory device. The memory device may be a volatile memory device such as a DRAM, or a non-volatile memory device such as a NAND or an MRAM. Also, storage devices such as a hard disk and an SSD may be used in place of the memory device. In the base station, these pieces of information of the other terminals that are non-base stations can also be obtained by notification from these terminals. In that case, MAC/PHY manager 60 is adapted to be capable of referring to and rewriting the information regarding the other terminals. Alternatively, the memory device for storing the information on the other terminals may be held and managed separately from the MIB. In that case, either MAC/PHY manager 60 or MAC common processor 20 is adapted to be capable of referring to and rewriting the separate memory device. Also, MAC/PHY manager 60 of the base station may include a grouping function for, when transmitting UL-MU, selecting the terminals to which the resource blocks for UL-MU communication are assigned on the basis of various pieces of information regarding terminals that are non-base stations, or on the basis of the requests from the terminals (i.e., selecting the terminals subject to UL-MU of this time). Also, MAC/PHY manager 60 or MAC processor 10 may manage the data (transmission) rate applied to the MAC frame and the physical header aimed at transmission. Also, MAC/PHY manager 60 of the base station may define a supported rate set which is a rate set supported by the base station. The supported rate set may include mandatory rates that should compulsorily supported by the terminal that is connected to the station itself and optional rates.

MAC processor 10 is configured to handle three types of MAC frames, i.e., a data frame, a control frame, and a management frame, and carry out various processing procedures defined in the MAC layer. Here, the three types of MAC frames are described.

The management frame is for use in management of communication link with another terminal. As the management frame, for example, a Beacon frame may be mentioned. The Beacon frame notifies attribute and synchronization information of a group to form a wireless communication group which is a Basic Service Set (BSS) in IEEE 802.11 standard. Also, a frame for authentication or establishing the communication link may also be mentioned. It is considered here that a state where a certain terminal completed exchange of information necessary for establishing a wireless communication with another terminal is expressed here as (the state where) the communication link is established. As the exchange of necessary information, for example, notification of the functions that the device itself supports (for example, support of the UL-MU scheme and various capabilities which will be later described, etc.), and negotiation regarding settings of the scheme may be mentioned. The management frame is generated on the basis of the instruction received by transmission processor 30 from MAC/PHY manager 60 via MAC common processor 20.

With regard to the management frame, transmission processor 30 achieves notifying various pieces of information to other terminals by the management frame. A terminal that is non-base station may notify the type of the terminal itself to the base station by putting in the management frame information regarding such as whether it is an UL-MU-compliant terminal, IEEE 802.11n-compliant terminal, or IEEE 802.11ac-compliant terminal. As for this management frame, for example, Association Request frame used in the association process which is one of the procedures for authentication between the terminal and the base station or Reassociation Request frame used in the reassociation process may be mentioned. The base station may notify the information on whether or not it supports UL-MU communication to the terminal that is non-base station by the management frame. As the management frame used for this, for example, the Beacon frame and a Probe Response frame may be mentioned. The Probe Response frame is a response to the Probe Request frame transmitted by the terminal that is non-base station. The base station may have a function of grouping terminals which are connected to itself. The above-described notification means at the base station may notify to each of the terminals a group ID of the assigned group through the management frame. As this management frame, for example, Group ID Management frame may be mentioned. The group ID may be, for example, a group ID that is defined in IEEE Std 802.11ac-2013. Also, when UL-MU communication is performed by the unit of this group, the base station may notify necessary information for specifying the resource blocks used by terminals that belong to this group through an arbitrary management frame.

Reception processor 40 has a receiver that receives various types of information via the management frame from other terminals. As one example, the receiver of the base station may receive information associated with compatibility with UL-MU communication from any terminal as a non-base station. Also, it may receive information associated with an adaptable channel width (the maximum available channel width) if this terminal is a legacy terminal (IEEE 802.11a/b/g/n/ac standard-compliant terminal and the like). The receiver of the terminal may receive from the base station information associated with compatibility as to whether or not UL-MU communication is supported.

The examples of the information to be transmitted and received via the management frame as described above are merely examples and various other types of information can be transmitted and received via the management frame between terminals (including the base station). For example, an UL-MU-compliant terminal may select either or both of a resource block and a channel that the terminal itself wants to use in the UL-MU transmission from either or both of non-interference channels and non-interference resource blocks based on carrier sense. And information regarding the resource block, channel, or both of them that have been selected may be notified to the base station. In this case, the base station, on the basis of this information, may perform assignment of the resource blocks for the UL-MU communication for each of the UL-MU-compliant terminals. It is considered here that the channels used in the UL-MU communication may be all of the channels that are available as the wireless communication system or may be a subset (one or a plurality) of the channels.

The data frame is for use in transmission of data to another terminal in a state where the communication link is established with the other terminal. For example, data is generated in the terminal by an operation of an application by a user, and the data is carried by the data frame. Specifically, the generated data is delivered from upper layer processor 90, via MAC common processor 20, and to transmission processor 30, and a MAC header is added to the Frame Body field, and thus the data frame is generated. In addition, a physical header is added to the data frame by PHY processor 50, the physical packet is generated, and the physical packet is transmitted via analog processor 70 and antenna 80. Also, when the physical packet is received by PHY processor 50, PHY processor 50 performs the processing for the physical layer on the basis of the physical header, and extracts the MAC frame (here, the data frame), and delivers the data frame to reception processor 40. When reception processor 40 receives the data frame (recognizes that the received MAC frame is a data frame), reception processor 40 extracts the information in the Frame Body field as data, and delivers the extracted data via MAC common processor 20 to upper layer processor 90. As a result, operations occur on applications such as writing, reproduction, and the like of the data.

The control frame is for use in control in transmission and reception (exchange) of the management frame and the data frame to/from (with) the other wireless communication device. As the control frame, for example, an RTS (Request to Send) frame, a CTS (Clear to Send) frame may be mentioned which are exchanged with the other wireless communication device to make a reservation of the wireless medium prior to starting exchange of the management frame and the data frame. Also, as another control frame, an acknowledgement response frame for confirmation of delivery of the received management frame and the data frame may be mentioned. As examples of the acknowledgement response frame, an ACK (Acknowledgement) frame and a BA (BlockACK) frame may be mentioned. Since the CTS frame is transmitted as a response to the RTS frame, it can be said that the CTS is a frame that represents an acknowledgement response. A CF-End frame is also one of the control frames. The CF-End frame is a frame that announces the completion of the CFP (Contention Free Period) in other words, a frame permitting other wireless communication devices to access the wireless medium. These control frames are generated by transmission processor 30. With regard to the control frames (the CTS frame, the ACK frame, the BA frame, etc.) transmitted as a response to the received MAC frame, reception processor 40 determines whether or not transmission of a response frame (control frame) is necessary, and outputs information necessary for frame generation (type of the control frame, information specified in the RA field, and the like) to transmission processor 30 along with the transmission instruction. Transmission processor 30 generates an appropriate control frame on the basis of the information necessary for generation of the frame and the transmission instruction.

When a MAC frame is transmitted on the basis of CSMA/CA (Carrier Sense Multiple Access with Carrier Avoidance), MAC processor 10 needs to acquire the access right (transmission right) on the wireless medium. Transmission processor 30, on the basis of carrier sense information from reception processor 40, measures the transmission timing. Transmission processor 30, in accordance with the transmission timing, gives the transmission instruction to PHY processor 50, and delivers the MAC frame thereto. In addition to the transmission instruction, transmission processor 30 may instruct a modulation method and a coding method to be used in the transmission. In addition to them, transmission processor 30 may provide an instruction regarding the transmission power. When MAC processor 10, after having acquired the access right (transmission right), obtained the period of time during which the medium can be occupied (Transmission Opportunity; TXOP), then MAC processor 10 is allowed to continuously exchange the MAC frames with other wireless communication devices although there is some limitation according to such as the QoS (Quality of Service) attribute. The TXOP is acquired, for example, when the wireless communication device transmits a predetermined frame (for example, an RTS frame) on the basis of CSMA/CA (Carrier Sense Multiple Access with Carrier Avoidance) and correctly receives a response frame (for example, a CTS frame) from another wireless communication device. When this predetermined frame is received by the other wireless communication device, the other wireless communication device transmits the above response frame after the elapse of the minimum frame interval (Short InterFrame Space; SIFS). Also, as a method of acquiring the TXOP without using the RTS frame, for example, cases may be mentioned where data frame that requests transmission of the acknowledgement response frame is transmitted directly in unicast (as will be described later, this frame may be a frame in the form of conjunct frames or conjunct payloads) or a management frame that requests transmission of the acknowledgement response frame is transmitted, and acknowledgement response frame (ACK frame, BlockACK frame or the like) in response thereto is correctly received. Alternatively, when a frame is transmitted that does not request, for the other wireless communication device, transmission of the acknowledgement response frame with a period equal to or longer than the time period needed to transmit this frame specified in the Duration/ID field (hereinafter referred to as Duration field) of this frame, then it may be interpreted that with the transmission of this frame, TXOP of the period described in the Duration field has been acquired.

Reception processor 40 is configured to manage the above-described carrier sense information. The carrier sense information is managed for each channel, for example. This carrier sense information includes both physical carrier sense information regarding busy/idle states of the medium (CCA) input from PHY processor 50 and virtual carrier sense information on the basis of the medium reservation time described in the received frame. If either one of these carrier sense information pieces indicates the busy state, then the medium is regarded as being in the busy state in which transmission is prohibited. It is considered here that in IEEE 802.11 standard, the medium reservation time is described in the Duration field in the MAC header. MAC processor 10, when having received a MAC frame that is addressed to other wireless communication devices (that is not addressed to the device itself), determines that the medium is virtually in the busy state from the end of the physical packet including this MAC frame over the medium reservation time. A scheme of this type for virtually determining that a medium is in the busy state, or the term during which the medium is virtually regarded as being in the busy state is called Network Allocation Vector (NAV). It can be said that the medium reservation time represents the length of time period during which suppression of accesses to the wireless medium is instructed, i.e., the length of time period during which accesses to the wireless medium are deferred.

Here, the data frame may be a frame such that a plurality of MAC frames are conjunct with each other or payload portions of a plurality of MAC frames are conjunct with each other. The former data frame is called A (Aggregated)-MPDU and the latter data frame is called A (Aggregated)-MSDU (MAC service data unit) in IEEE 802.11 standard. In the case of the A-MPDU, a plurality of MPDUs are conjunct with each other within the PSDU. Also, in addition to the data frame, the management frame and the control frame are also eligible for this conjunction. In the case of the A-MSDU, MSDUs which are a plurality of data payloads are conjunct with each other within the frame body of one MPDU. In both cases of the A-MPDU and the A-MSDU, delimiter information (length information, etc.) is stored in the data frame such that the conjunction of the MPDUs and combination of MSDUs can be appropriately separated by the terminal on the reception side. Both of the A-MPDU and the A-MSDU may be used in combination. Also, the A-MPDU may involve not a plurality of MAC frames but one single MAC frame, and also in this case the delimiter information is stored in the data frame. Also, when the data frame is an A-MPDU or the like, responses to the plurality of MAC frames are transmitted together. The BA (Block-ACK) frame is used as the response in this case in place of the ACK frame. In the following explanations and figures, the notation of MPDU may be used, but it is assumed here that this notation includes not only the single MAC frame but also the cases of the above-described A-MPDU and the A-MSDU.

According to IEEE 802.11 standard, several procedures are defined in multiple stages to be taken for a terminal that is non-base station to participate in a BSS (which is called Infrastructure BSS) configured with the base station amongst others and to perform exchange of data frames within the BSS. For example, there is provided a procedure called association, according to which an Association Request frame is transmitted from the terminal that is non-base station to the base station to which the terminal requests the connection. The base station, after having transmitted an ACK frame for the association request frame, transmits an Association Response frame which is a response to the association request frame.

The terminal stores the capability of the terminal itself in the association request frame and transmits this association request frame, and thus can make notification of the capability of the terminal itself to the base station. For example, the terminal may add, to the association request frame, the channel, the resource (resource block or stream), or both of them that the terminal itself can support, and information for identifying the standard supported by the terminal itself into the association request frame and transmit this association request frame. This information may be also set in the frame transmitted by the procedure called reassociation (reassociation) to reconnect to another base station. In this procedure, a Reassociation Request frame is transmitted to the other base station to which reconnection is requested from the terminal. The other base station, after having transmitted the ACK frame in response to the reassociation request frame, transmits a reassociation response which is a response to the reassociation request frame.

As the management frame, in addition to the association request frame and the reassociation request frame, a beacon frame, a probe response frame, etc. may be used. The beacon frame is basically transmitted by the base station, and is capable of storing parameter notifying the capability of the base station itself along with the parameters indicating the attributes of the BSS. In view of this, as the parameter notifying the capability of the base station itself, the base station may be adapted to add the information on whether or not UL-MU communication is supported. Also, as the other parameter, information on the supported rates of base station may be notified. The supported rates may include mandatory rates and an optional rate. The probe response frame is a frame transmitted from the terminal that transmits the beacon frame in response to a probe request frame received. The probe response frame is basically the one that notifies the same content as that of the beacon frame, and the base station, when it uses the probe response frame, is also capable of notifying the capability of the station itself (whether or not UL-MU communication is supported, supported rate and the like) to the terminal that transmitted the probe request frame. By making this notification to the UL-MU-compliant terminal, an operation may be performed according to which the terminal, for example, enables the function of the UL-MU communication of the terminal itself.

It is considered here that the terminal may notify the information regarding the rates available on the device itself from among the supported rates of the base station rate as the information for notifying the capability of the device itself to the base station. Meanwhile, it is considered that with regard to the mandatory rates from among the supported rates, a terminal that is connected to the base station has the capability of executing the mandatory rates.

It is considered here that if notification of other piece or pieces of information among the pieces of information mentioned above makes it to essential of the piece or pieces of information, then notification of the other piece or pieces of information may be omitted. For example, suppose a case where a terminal is always an UL-MU-compliant terminal if a capability that is compliant with a new standard or specifications is defined and as long as the terminal is compliant with that capability or specifications, notification of the fact that the terminal is an UL-MU-compliant terminal does not need to be explicitly performed.

Figure 4:
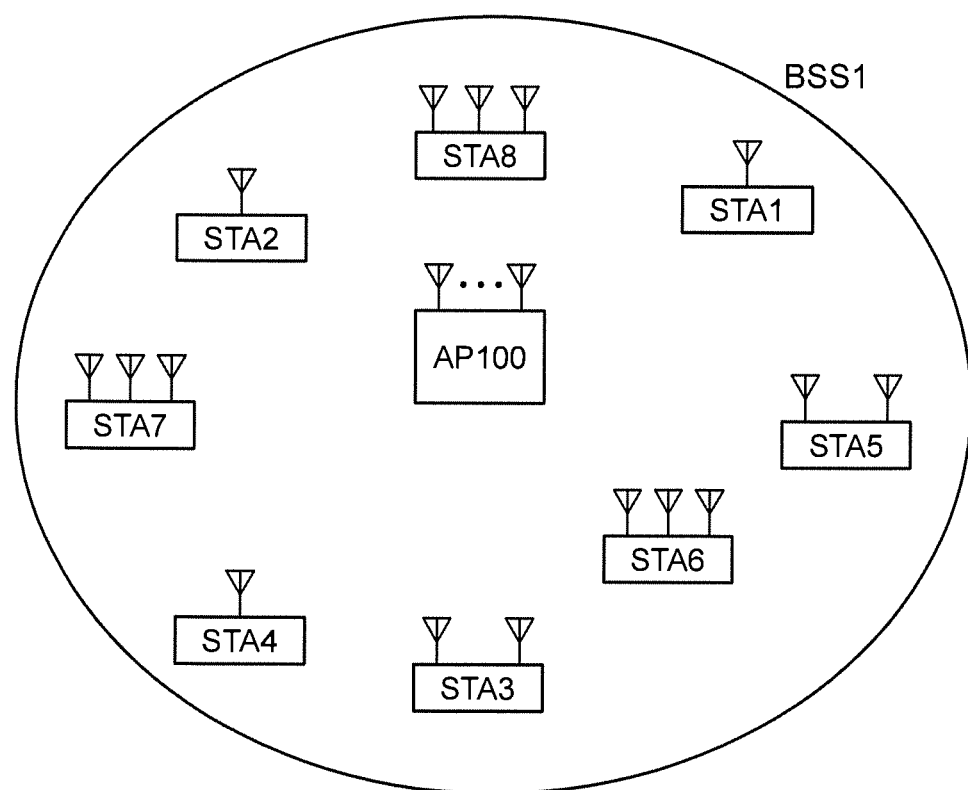
FIG. 4 is a diagram illustrating a wireless communication group including a base station and a plurality of terminals.

FIG. 4 illustrates a wireless communication system in accordance with this embodiment. This system includes a base station (AP: Access Point) 100 and a plurality of terminals (STA: STAtion) 1 to 8. The BSS (Basic Service Set) 1 is formed by base station 100 and terminals 1 to 8 operating under base station 100. This system is a wireless LAN system compliant with IEEE 802.11 standard using CSMA/CA (Carrier Sense Multiple Access with Carrier Avoidance). It is considered here that legacy terminals (IEEE 802.11a/b/g/n/ac standard-compliant terminals, etc.) other than the terminals (UL-MU terminals) in accordance with this embodiment may exist within BSS 1.

Figure 5A:
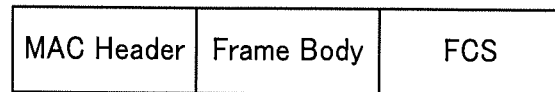
FIGS. 5A and 5B illustrate a basic exemplary format of a MAC frame.
Figure 5B:
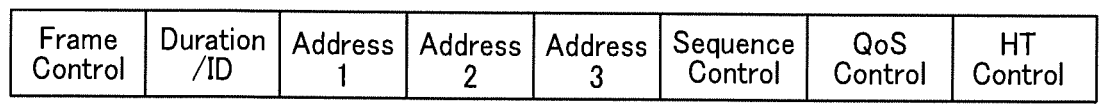

FIG. 5A illustrates the basic exemplary format of the MAC frame. The data frame, the management frame, and the control frame in accordance with this embodiment are based on a frame format of this type. This frame format basically includes the fields of MAC header, Frame body, and FCS. The MAC header includes, as illustrated in FIG. 5B, the fields of Frame Control, Duration/ID (called simply Duration in some cases), Address 1, Address 2, Address 3, Sequence Control, QoS Control, and HT (High Throughput) Control.

These fields do not need to always exist and there may be cases where some of these fields do not exist. Also, any field or fields that are not illustrated in FIG. 5 may exist. For example, an Address 4 field may further exist. Also, a notification field (or may be called a control field) as will be described later may exist in the MAC header as a field or a subfield.

The field of Address 1 indicates Receiver Address (RA), the field of Address 2 indicates Transmitter Address (TA), and the field of Address 3 indicates either BSSID (Basic Service Set IDentifier) (which may be the wildcard BSSID whose bits are all set to 1 to cover all of the BSSIDs depending on the cases) which is the identifier of the BSS, or TA, depending on the purpose of the frame.

As described above, two fields of Type and Subtype are set in the Frame Control field. The rough classification as to whether it is the data frame, the management frame, or the control frame is made by the Type field, and fine discrimination of more specific types among the roughly classified frames, for example, as to whether it is a BA frame, a BAR frame, or a beacon frame within the control frame is made by the Subtype field.

The Duration/ID field describes the medium reservation time as described above, and it is determined that the medium is virtually in the busy state from the end of the physical packet including this MAC frame to the medium reservation time when a MAC frame addressed to another terminal is received. The scheme of this type to virtually determine that the medium is in the busy state, or the period during which the medium is virtually regarded as being in the busy state, is, as described above, called NAV (Network Allocation Vector). The QoS field is used to carry out QoS control to carry out transmission with the priorities of the frames taken into account. The HT Control field is a field introduced in IEEE 802.11n and exists when the Order field in the frame control field is set to 1 in the QoS data frame or the management frame. The HT Control field can be extended to VHT (Very High Throughput) Control field of IEEE 802.11ac or to HE (High Efficiency) Control field of IEEE 802.11ax which is the next generation wireless LAN standard and is capable of making notification according to various functions of IEEE 802.11n, IEEE 802.11ac or IEEE 802.11ax, respectively.

Figure 6:
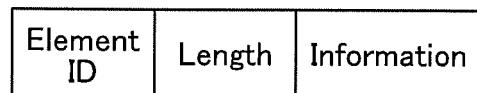
FIG. 6 is a diagram illustrating an exemplary format of an information element.

In the management frame, an information element (Information element; IE) to which a unique Element ID (IDentifier) is assigned is set in the Frame Body field. One or a plurality of information elements may be set in the Frame Body field. The information element has, as illustrated in FIG. 6, the fields of an Element ID field, a Length field, and an Information field. The information element is discriminated by the Element ID. The Information field is adapted to store the content of the information to be notified, and the Length field is adapted to store the length information of the information field. The notification field (control field) which will be described later may be set to a Body field of the management frame. In this case, the notification field may have a format of the information element.

Frame check sequence (FCS) information is set in the FCS field as a checksum code for use in error detection of the frame at the reception side. As an example of the FCS information, CRC (Cyclic Redundancy Code) may be mentioned.

Figure 7:
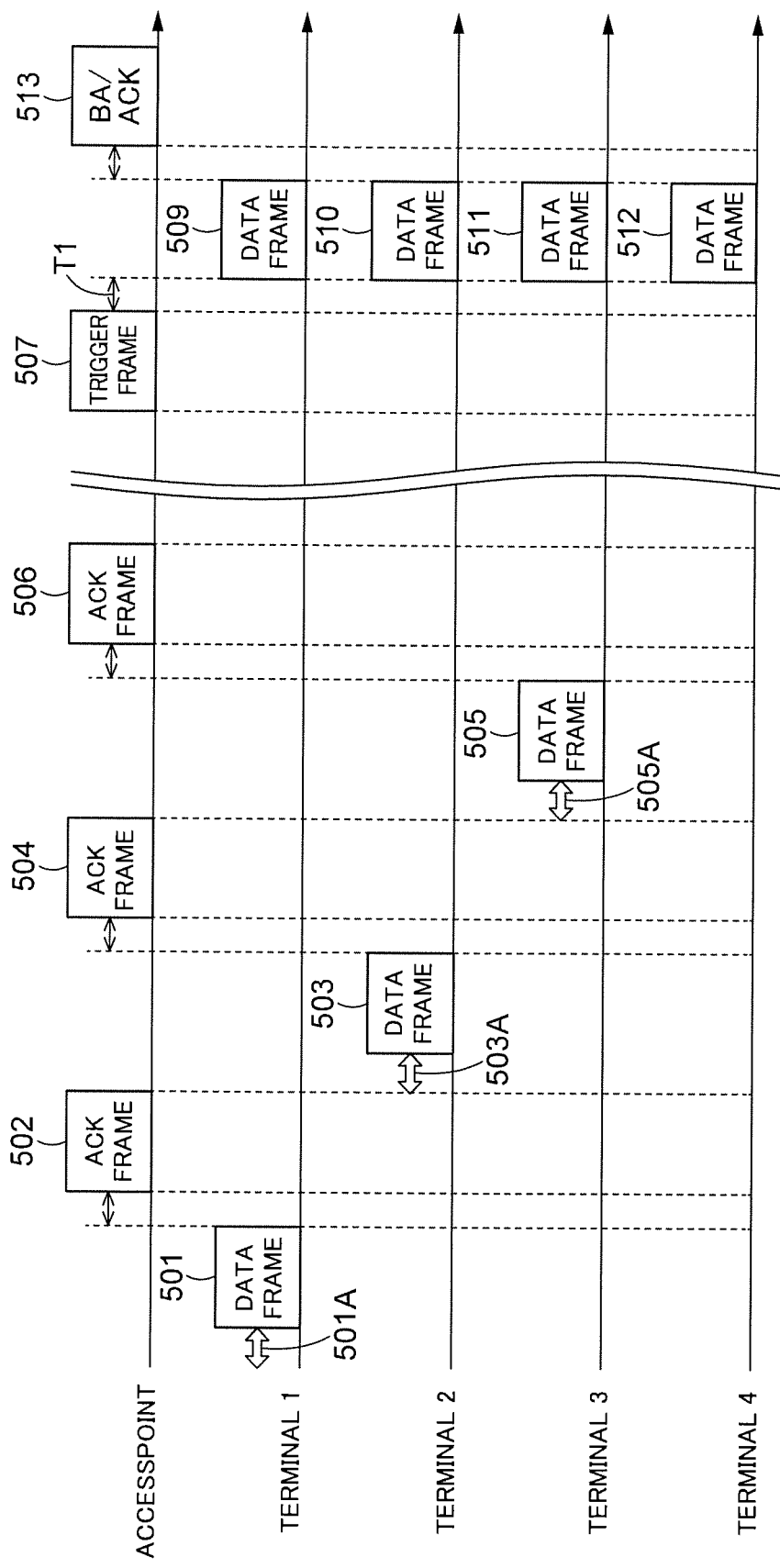
FIG. 7 is a diagram illustrating an operation sequence in accordance with the present invention.

FIG. 7 illustrates an exemplary operation sequence of the base station (AP) 101 and a plurality of terminals including the terminals (STAs) 1 to 4 in accordance with this embodiment. The plurality of terminals including terminals 1 to 4 is UL-MU-compliant terminals. Though the terminals other than terminals 1 to 4 are not shown in the figure, actually, the other terminals 5 to 8 may exist as illustrated in FIG. 4.

In the figure, a short section indicated by a solid line with bilateral arrows represents short interframe space (SIFS). However, the section given reference character T1 indicates SIFS or another certain time (IFS). Sections 501A, 503A, and 505A indicated by bold arrows represent a total (carrier sense time or standby time) of DIFS/AIFS[AC] time and CSMA/CA backoff time. However, SIFS and DIFS/AIFS [AC] time are only examples, and it may be another time (IFS) as long as it is certain time determined in advance. It is considered here that the DIFS/AIFS [AC] time refers to either the DIFS time or the AIFS [AC] time. When it is not QoS-compliant, the DIFS/AIFS [AC] time refers to the DIFS time. When it is QoS-compliant, the DIFS/AIFS [AC] time refers to the AIFS [AC] time which is defined in accordance with the access category (AC) (to be later described) of the data to be transmitted.

In this exemplary operation sequence, under a circumstance that communications are performed with the basic channel width (or a band width connecting a plurality of channels) individually between the base station and the individual terminals including terminals 1 to 4, the base station determines start of UL-MU (UL-OFDMA or UL-MIMO) transmission. When the base station determines the start of the UL-MU transmission, it transmits a trigger frame (a physical packet including the trigger frame to be more precise) 507 which becomes a trigger of the UL-MU transmission, and terminals 1 to 4 transmit the data frames (physical packets including the data frames to be more precise) 509, 510, 511, and 512 after certain time T1 from reception of the trigger frame. As a result, the UL-MU transmission from terminals 1 to 4 to the base station is carried out. In contrast with the UL-MU communication, communication carried out individually with the basic channel width (or a band width connecting a plurality of channels) between the individual terminals and the base station is called single user communication in some cases. Hereinafter, this sequence will be described to be more precise.

Before the UL-MU transmission is started, the normal single user communication is carried out between the base station 101 and the individual terminals including terminals 1 to 4. That is, when the data for uplink transmission is held in terminal 1, terminal 1 measures the CCA value by carrying out the carrier sense during the carrier sense time (standby time) of the DIFS/AIFS[AC] and a randomly determined backoff time in order to acquire the access right to the wireless medium, and when it has been determined that the medium (CCA) is in the idle state, terminal 1 acquires the access right to transmit, for example, one frame. Terminal 1 transmits a data frame (more specifically, a physical packet including the data frame) 501 including the data to be transmitted and when the base station has received this data frame 501 successfully, then the base station returns an ACK frame (more specifically, a physical packet including the ACK frame) 502 which is an acknowledgement response frame after the elapse of SIFS time after completion of reception of data frame 501. Terminal 1 upon reception of ACK frame 502 determines that the transmission of data frame 501 has been successful.

It is considered here that the data frame to be transmitted to the base station may be an aggregation frame (A-MPDU, etc.), and the acknowledgement response frame by which the base station responds may be a BA frame (this also applies to the following explanations).

Terminal 2 similarly acquires the access right and transmits data frame 503, and the base station transmits ACK frame 504 after the elapse of the SIFS time after completion of reception of data frame 503. Terminal 3 also acquires the access right and transmits data frame 505 similarly, and the base station transmits ACK frame 506 after the elapse of the SIFS time after completion of reception of data frame 505. The illustrated examples illustrate the case where only terminals 1 to 3 transmit the data frames to the base station, but terminal 4 and the terminals 5 to 8, not shown, may carry out frame exchange similarly. Also, in the illustrated examples, the communication is conducted in the order of terminal 1, terminal 2, and terminal 3, but this is only an order of acquiring the access right, and the communication may be conducted in any order.

Here, in data frames 501, 503, 505, etc. to be transmitted to the base station, each terminal sets notification information (may also be called control information) that the base station requires in UL-MU in a notification field (control field). That is, the data frame has a role of transmitting the notification information required for UL-MU in addition to a role of transmitting the above-described data to the base station. In other words, the data frame includes information (above-described data) with a purpose different from that of the notification information in the Frame Body field. The notification information may be set to data frames transmitted in UL-MU in addition to the data frames to be single-user transmitted.

Examples of the notification information include information relating to presence of a request of UL-MU transmission, information relating to presence of data for which UL-MU transmission is desired, information relating to a data type of the data for which UL-MU transmission is desired and the like. Moreover, information relating to a data amount of data for which UL-MU transmission is desired (a number of pieces or a size of the data or both) is also included. Moreover, a desired communication scheme (communication scheme of OFDMA or MU-MIMO) is also included. Moreover, a desired resource (a resource block for OFDMA and a stream for MU-MIMO) or a number of resources according to the communication scheme may be also included. The desired resource may be specified by a resource number or a stream number or may be specified by the other methods. Moreover, information of an occurrence cycle of data in the terminal may be also included. Moreover, a value of communication delay allowable by the application (allowable delay) can be included. The notification information may include at least one of the information in the examples described here or may include information of a type not described here. The notification information is spontaneously transmitted from the individual terminals in a state where a transmission request for the notification information from the base station is not made. That is, the individual terminals transmit the notification information in a form joining in a frame to be transmitted in the normal single user communication. Moreover, as described above, when a plurality of frames (data frames, etc.) are UL-MU transmitted from a plurality of terminals, notification information for each of the terminals can be set to the respective frames and transmitted in a form joining in the frames. In this case, notification information for determining matters required for the subsequent UL-MU transmission can be transmitted during the UL-MU transmission. Details of the contents of the notification information will be described later.

Figure 8A:
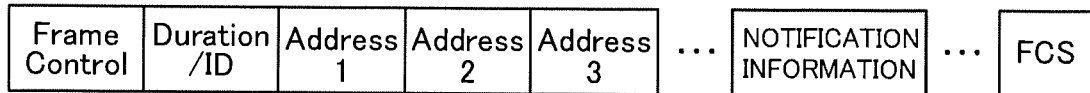
FIGS. 8A and 8B are a diagram illustrating a format example including a notification information field.
Figure 8B:
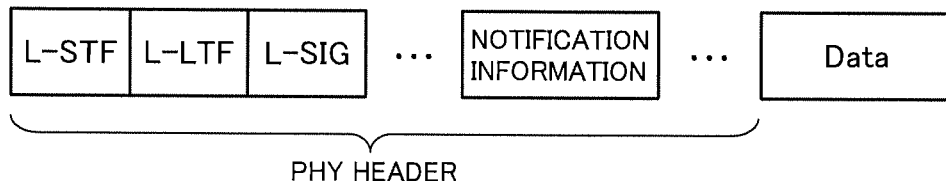

Here, the notification field in which the notification information is set may be provided as a new field in the MAC header as illustrated in FIG. 8A. Alternatively, a reserved area in the existing field (field defined by the existing standard) may be used as the notification field. Moreover, the notification field may be provided in the physical header as illustrated in FIG. 8B or a reserved area in the existing field in the physical header may be used as the notification field. Moreover, the notification field may be set not in the MAC header but in a Body field of the frame. If the data frames to be transmitted to the base station construct an A-MPDU, for example, one of the plurality of MAC frames is made the management frame, and the Frame Body field of the management frame may carry the notification field. At this time, the notification field may specifically have the information element format as previously illustrated in FIG. 6, where an element ID may be newly assigned to the information element in which the notification field is set. Moreover, a new value may be defined to the frame including the notification field as a subtype of the Frame Control field. An information element of the notification field may be additionally set in the frame body of the existing management frame. The specific format of the notification field relies on the contents of the notification information to be set.

Here, the notification information to be notified by each terminal in the notification field will be explained. As described above, the notification information is used for the base station to carry out scheduling including determination of required matters of UL-MU and the like.

As a first example of the notification information, information relating to presence of a request for UL-MU transmission can be cited. When there is remaining data to be transmitted to the base station is present in a transmission buffer (transmission queue), it can be considered that there is a request for UL-MU transmission. As a format example of the notification information, it may be set by using 1 bit such that in the case of bit 1, there is a request for UL-MU transmission, while in the case of bit 0, there is no request for UL-MU transmission. Alternatively, a bit relationship may be opposite to this. When the base station is to select a target terminal of the UL-MU transmission, it may select them from the terminals having the requests for UL-MU transmission. As a variation, a more data field in the Fragmentation field used for notifying presence of remaining data for downlink to some terminal in a power-save mode may be used also as the notification information of the first example. Presence of transmission data may be notified by setting the bit of the more data field to 1, for example. There can be such a method that the notification field itself is not provided if there is no request for UL-MU transmission.

There can be a case where the terminal has data to be transmitted to the base station but it wants to transmit by single user transmission, not by the UL-MU transmission. Since the plurality of terminals share the resource (one channel width band, for example) in the UL-MU transmission, a frame length (physical packet length) in transmission of the same data size becomes longer than that in the single user transmission in which one terminal can use one channel band width. When the frame length becomes longer, a possibility of failure in transmission (possibility that a frame error is detected on the reception side) becomes higher. Thus, there can be a situation that the terminal wants to conduct the single user transmission, not the UL-MU transmission, if reliable transmission is desirable. In such a case, the terminal only needs to set information indicating that there is no transmission request (there is no remaining data) in the notification field and to carry out single user transmission of the data as usual on the CSMA/CA basis.

As a second example of the notification information, it may be information for specifying presence of a request for UL-MU transmission for each data type (that is, presence of data for UL-MU transmission for each data type) in the terminal. The data type may be IEEE 802.11 standard TID (Traffic ID: traffic type) or AC (Access Category). In the following, AC will be basically described as the data type, but TID may be used instead (the same applies to explanations for a third or later example of the notification information).

As a priority control scheme using the access category (AC), EDCA (Enhanced Distributed Channel Access) is known. EDCA will be explained briefly. In the wireless LAN based on IEEE 802.11 standard, when data is delivered from an upper layer (LLC layer or the like) to the MAC layer, in the case where the terminal is compliant to QoS (Quality of Service), a traffic type (TID) is notified together with the data. The terminals compliant to the existing standards such as IEEE 802.11n or IEEE 802.11ac are compliant to QoS.

The data is classified into four ACs on the basis of the traffic type, for example. As an example, values of TID are 0 to 15, and 0 to 7 are used by the terminal (including the base station) in the EDCA environment, while 8 to 15 are used by the terminal (including the base station) in the HCCA (hybrid coordination function (HCF) controlled channel access (HCCA)) environment or in the HEMM (HCCA, EDCA mixed mode) environment. Here, the EDCA environment is assumed, and the data is classified into any one of four ACs in accordance with the value of TID which is any one of 0 to 7.

As for the AC types, BACKGROUND (AC_BK), BEST EFFORT (AC_BE), VIDEO (AC_VI), and VOICE (AC_VO) are defined. Transmission buffers (transmission queues) are provided for the four ACs, respectively, and the classified data is stored in the applicable transmission buffer. The transmission buffer (transmission queue) may be a memory device or may be an SSD, a hard disk and the like. If the transmission buffer is a memory device, the memory device may be a volatile memory device such as a DRAM or may be a non-volatile memory device such as a NAND or an MRAM.

An EDCA parameter is determined for each AC, and this parameter determines a difference in priority in a medium access in transmission. As an example of the parameter, AIFS[AC] and a minimum value CWmin and a maximum value CWmax of a Contention Window (CW) can be cited. AIFS[AC], CWmin and CWmax are set to smaller values for the AC with the higher priority of a medium access. The other examples of the parameter include TXOP limit which is an upper limit value of TXOP.

In the terminal, the procedure for data transmission based on CSMA/CA is independently carried out for each AC having data for transmission. That is, the carrier sense is carried out during a waiting time including AIFS[AC] and the backoff time for each AC, and the AC whose waiting time reaches zero for the first time acquires the access right. When there is a plurality of AC whose waiting time has become zero at the same time, the AC with higher priority in medium access acquires the access right. The backoff time (random time) is obtained by multiplying an integer selected randomly from the Contention Window (CW) by a slot time. An initial value of CW is given by CWmin and the value of CW is incremented up to CWmax at each re-transmission.

Figure 9:
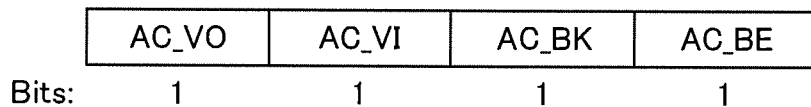
FIG. 9 is a diagram illustrating an example of a format indicating presence of a request of UL-MU transmission by each access category.

FIG. 9 illustrates an example of a format indicating presence of a request for UL-MU transmission (presence of data for UL-MU transmission) for each AC. 1 bit is provided for each of BACKGROUND (AC_BK), BEST EFFORT (AC_BE), VIDEO (AC_VI), and VOICE (AC_VO). It can be configured that bit 1 is set when there is data in a transmission queue applicable to each of these ACs, while bit 0 is set when there is no data. Alternatively, a bit relationship may be opposite to this. In this example, four bits are needed in order to represent presence of data for transmission of each AC.

Figure 10:
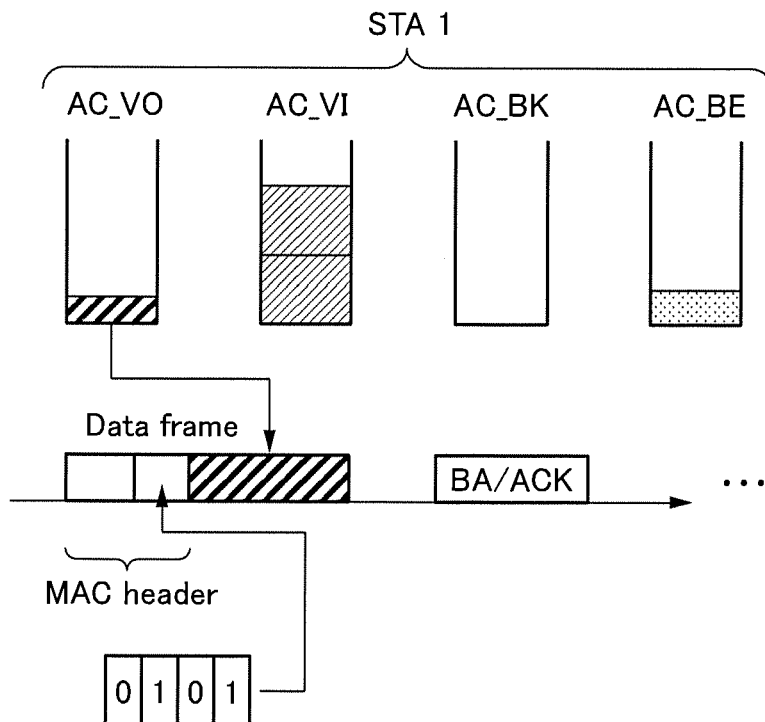
FIG. 10 is a diagram illustrating a specific operation example of notification of presence of data for transmission by each access category.

FIG. 10 illustrates a specific operation example of notification of presence of data for transmission in each AC by using a format in FIG. 9. A transmission queue is provided for each AC, and there is one MSDU (may be also MPDU, PSDU or PPDU, etc.) in the transmission queue of AC_VO. Two MSDUs are present in the transmission queue of AC_VI, no MSDU is present in the transmission queue of AC_BK, and one MSDU is present in the transmission queue of AC_BE. A size of each MSDU does not have to be the same and the size of MSDU is different depending on the AC in the illustrated example. Assume that a procedure compliant to CSMA/CA is started simultaneously and independently in each AC at transmission, the waiting time of AC_VO first becomes zero, and it acquires the access right. In this case, the first MSDU in the transmission queue of AC_VO is read, and the transmission queue becomes empty. A Body field of the MAC frame is generated on the basis of the read MSDU, and by adding the MAC header to the Body field, a MAC frame is generated. At this time, information indicating presence of remaining data for transmission is set for each AC in the notification field of the MAC header. Since the transmission queue in AC_VO is empty, bit 0 is set to an applicable subfield, since MSDU (two pieces) is present in the transmission queue in AC_VI, bit 1 is set to an applicable subfield, since the transmission queue in AC_BK is empty, bit 0 is set to an applicable subfield, and since there is MSDU (one piece) in AC_BE, bit 1 is set to an applicable subfield, respectively. The generated MAC frame is transmitted to the base station in TXOP based on the acquired access right. In the illustrated example, an acknowledgement response frame (BA frame or ACK frame, etc.) is received by terminal 1 from the base station after elapse of SIFS time after the transmission of the MAC frame.

In the existing IEEE 802.11 standard, when bit 1 is set in the more data field in the Frame Control field of the MAC header in the MAC frame (beacon frame, etc.) transmitted by the base station, it is interpreted that there is still data in the same access category (AC) in the base station, but it leads to a problem that a state of the transmission queue in the other ACs cannot be notified to the terminal. On the other hand, since the state of the transmission queue in a plurality of ACs can be notified by the notification information in the second example, the base station can efficiently carry out UL-MU communication.

As a third example of the notification information, a priority of transmission (discriminated from the priority of the above-described medium access) may be set for each AC. The priority of "high", "medium", and "low" may be set for each AC, for example. The priorities in the number smaller than or larger than three may be defined. If there is no data for transmission, the transmission priority may be set to "low", or priority "none" or the like indicating that there is no data for transmission may be defined separately. The notification information may be defined by combining this third example with the second example. In this case, presence of data for transmission and the priority of transmission are set for each AC.

As a fourth example of the notification information, AC which has data most desirable to transmitted among the plurality of ACs (AC_VO, AC_VI, AC_BK, and AC_BE), that is, AC with the highest transmission priority may be designated. In this case, in order to designate one of these four ACs, 2 bits are needed. It may be so designated, for example, "00" for AC_VO, "01" for AC_VI, "11" for AC_BK, and "10" for AC_BE. The notification information may be defined by combining this fourth example with the second example. In this case, bits representing presence of data transmission (4 bits, for example) and bits designating one AC in this example (2 bits, for example) are needed for each AC.

As a fifth example of the notification information, it may be information for specifying a data amount for transmission for each of all or some ACs. The data amount may be a number of pieces of data present in the transmission queue in each AC (here, it is assumed to be MSDU but it may be PPDU or other PDU or SDU) or a size of each MSDU or both of them. Alternatively, it may be a total data size of MSDU remaining in the transmission queue. Moreover, it may be a time length, not the size. Other than those described here, it may be anything as long as it is information that can specify the data amount. When transmission is to be carried out by transmission by an aggregation frame (A-MPDU or A-MSDU, etc.), for example, it may be information on how many aggregation frames are present. A quantizing method in expressing the data amount may be an arbitrary method. It may be assumed that a basic unit is 32 µs which is a time length, and the data amount may be expressed by integer times of 32 µs, for example. At this time, if a field length for setting the data amount is 8 bits, 32 µs to 8160 µs can be expressed, for example. The 32 µs is an example, and a time length with another size may be also used as a basic unit. Moreover, 8 bits are also an example, and a field length with another length may be also used. Moreover, as another quantizing method, it may be assumed that the basic unit is 4096 octets which is a size, and the data amount may be expressed by integer times of 4096 octets. It may be so configured that, when the field length for setting the data amount is 4 bits and a value of the field is 1, it expresses 4096 octets, and in the case of 2, it expresses 8192 octets or the like. When an actual data amount does not match integer times of 4096 octets, a value larger than and the closest to the actual data amount may be employed. If the value of the field is 15, it may indicate that the data amount is larger than 57344 octets. The 4096 octets are an example, and another size may be used as a basic unit. Moreover, the 4 bits are also an example, and a field length with another length may be also used.

As a sixth example of the notification information, it may be information for specifying a data amount (not for each AC) for overall transmission in the terminal. Specifically, a number of pieces of the data for transmission (here, it is assumed to be MSDU but it may be PPDU or other PDU or SDU) remaining in the transmission buffer (transmission queue) or a size of each MSDU or may be the both. Alternatively, it may be a total size of the MSDU remaining for transmission or may be information other than described here. Moreover, it may be a time length, not the size. Other than those described here, it may be anything as long as it is information that can specify the data amount. When transmission is to be carried out by transmission by an aggregation frame (A-MPDU or A-MSDU, etc.), for example, it may be information on how many aggregation frames are present. A quantizing method in expressing the data amount may be an arbitrary method. It may be assumed that a basic unit is 32 µs which is a time length, and the data amount may be expressed by integer times of 32 µs, for example. At this time, if a field length for setting the data amount is 8 bits, 32 µs to 8160 µs can be expressed, for example. The 32 µs is an example, and a time length with another size may be also used as a basic unit. Moreover, 8 bits are also an example, and a field length with another length may be also used. Moreover, as another quantizing method, it may be assumed that the basic unit is 4096 octets which is a size, and the data amount may be expressed by integer times of 4096 octets. It may be so configured that, when the field length for setting the data amount is 4 bits and a value of the field is 1, it expresses 4096 octets, and in the case of 2, it expresses 8192 octets or the like. When an actual data amount does not match integer times of 4096 octets, a value larger than and the closest to the actual data amount may be employed. If the value of the field is 15, it may indicate that the data amount is larger than 57344 octets. The 4096 octets are an example, and another size may be used as a basic unit. Moreover, the 4 bits are also an example, and a field length with another length may be also used.

As a seventh example of the notification information, it may be information for specifying a TXOP length required for the subsequent transmission for all or some ACs. The TXOP length may be expressed, by assuming that the basic unit is 32 µs, by integer times of 32 µs, for example. At this time, if a field length for setting the TXOP length is 8 bits, 32 µs to 8160 µs can be expressed, for example. The 32 µs is an example, and a time length with another size may be also used as a basic unit. Moreover, 8 bits are also an example, and a field length with another length may be also used. Instead of the TXOP length, a data amount required for the subsequent transmission may be used for each of all or some ACs. The data amount may be a data length of PPDU or MSDU, etc. An expressing method of the data amount is similar to the notification information in the fifth or sixth example. Here, the information for specifying the TXOP length or the data amount required for the subsequent transmission is explained for each AC but it may be information for specifying the TXOP length or the data amount required for the subsequent transmission in the terminal, not for each AC.

As an eighth example of the notification information, it may be information on which of OFDMA and MU-MIMO (may be MU-MIMO&OFDMA as described above. The same applies to the following) the terminal wants to use. If the terminal is compliant to only either one of the communication schemes and it has already notified the base station of the communication scheme to which the terminal itself is compliant during an association process or the like, notification of this information may be omitted.

As a ninth example of the notification information, it may be information specifying a desired resource (a resource block in OFDMA and a stream in MU-MIMO) or information expressing the resource number or both of them in compliant to the UL-MU communication scheme (OFDMA or MU-MIMO). Specification of the desired resource may be made by a resource number or a stream number or may be made by another method. As an example of another method, the desired resource may be specified by designating a range of resource numbers. When there are resource numbers 1 to 8, for example, the range may be designated such as "resource numbers 6 to 8". At this time, a plurality of ranges may be designated.

The various types of notification information illustrated in the above-described first to ninth examples are used singularly and also may be used in arbitrary combination as long as it does not cause conflict. The notification information may be defined by combining both the first example and the second example, for example. Three or more pieces of the notification information may be also combined. The first to ninth examples are only exemplification and information other than them can be also used as the notification information. Information indicating an occurrence cycle of data in the terminal may be used, for example. The occurrence cycle may be information for each AC or for each TID described above. Alternatively, it may be information indicating a value of communication delay (allowable delay) allowable in the application of the terminal. Moreover, information relating to TSPEC (Traffic Specification) defined by IEEE 802.11 standard (average data rate, MSDU length, minimum physical rate, etc.) may be transmitted as notification information. When a plurality of pieces of the notification information is to be transmitted, they may be transmitted in one frame or may be divided into a plurality of frames in transmission.

Here, a part of or the whole of the notification information may be set by using an existing field such as QoS Control field. At this time, a reserved area in the existing field may be used, or when the existing field has a plurality of pattern formats, a pattern may be newly defined for setting the notification information so that the notification information is set in the new pattern format. A value of the existing field itself may be used as the notification information. For example, the format of the QoS Control field is different in accordance with the subtype of the Frame Control field, but a TID subfield and a TXOP Duration Requested subfield are included as an example. In the TID subfield, TID of the data currently being transmitted is set, and a value required as the subsequent TXOP is set in the TXOP Duration Requested subfield. The values of these subfields may be used as the notification information.

The base station manages a state of each terminal by storing the notification information notified from each terminal in the notification field in an internal storage device and by managing the notification information of each terminal. As described above, notification of the notification information in the notification field includes a case where the existing field is used. The base station determines execution of the UL-MU transmission at arbitrary timing, at timing determined in advance or at timing when a condition determined in advance is satisfied or the like. As the timing determined in advance, it may be by each certain beacon interval cycle or may be other timings. As the condition determined in advance, it may be presence of a certain number or more of the terminals which request UL-MU transmission or it may require satisfaction of a predetermined criterion by a radio wave situation (busy rate, usage or any other indexes). It is only necessary for the base station to determine execution of the UL-MU transmission independently of reception of the data frame transmitted in single-user from terminals 1 to 4.

When the base station determines execution of UL-MU transmission, it determines matters required for the UL-MU transmission. Target terminals of UL-MU transmission are selected, for example. As a selecting method, selection may be made from the terminals which have the requests for UL-MU transmission. At this time, the selection may be made from the terminals having data for transmission of a specific data type (AC or TID, etc.). Alternatively, the target terminal may be selected on the basis of the data amount or the TXOP length or the data amount required for the subsequent transmission such that the terminal with the largest data amount of the specific data type or the largest TXOP length or the data amount required for the subsequent transmission is selected with priority, or the terminal with substantially the same data amount or the same TXOP length or the same data amount required for the subsequent transmission is selected (details will be described later). Alternatively, the terminal may be selected on the basis of the priority in transmission of a specific data type such as the terminal with the highest priority in transmission of the specific data type. Alternatively, the terminal belonging to the same group may be selected when the base station groups the terminals. Alternatively, as a standard for selecting a group, an item of presence of a request for UL-MU transmission, a data amount of a specific data type or priority or the like for each terminal belonging to each group may be considered. The selection may be made on the round-robin basis or may be made in a random manner. Alternatively, the selection method may be a method of selecting terminals having data with the same or close size as that of the data to be transmitted or a method of selecting terminals having the same or close occurrence cycle of data (terminals having the occurrence cycle included within a certain value or terminals having the closest predetermined number of the occurrence cycles) or the like. Alternatively, when a propagation path response with each terminal is grasped in advance, a combination of terminals with small spatial correlation (small interference) may be selected. The number of terminals to be selected should be within a range of the maximum multiplexing number or less according to the communication scheme. In the case of OFDMA, it is selected within a range of the maximum available resource block number or less and in the case of MU-MIMO, it is selected within the maximum available spatial resource number (maximum stream number) or less. A lower limit of the terminal numbers to be selected is determined, and the number of the terminals at the lower limit or more may be selected.

Moreover, the base station carries out assignment of resources to be used in UL-MU transmission to the selected target terminals. The resources are resource blocks (one or a plurality of subcarriers) in the case of OFDMA and spatial resource (streams) in the case of MU-MIMO. In the assignment of resources, the resources are assigned so as not to be overlapped between the target terminals. When usable resources are determined in advance for each terminal (for example, when determined at association with the base station or at arbitrary timing after that or when the usable resources are determined in accordance with the capability of the terminal or the like), the resources determined in advance are assigned. In the processing of selecting the target terminal described above, the target terminals may be selected so that the usable resources are not overlapped between the terminals by considering the resource usable in each terminal.

Other than selection of the target terminals and assignment of the resources described above, other parameter information to be specified to the target terminals may be determined. As an example, the base station may determine a PPDU length transmitted by the target terminal in common. When notification information including a TXOP length or a data amount required for the subsequent transmission or the both is received from the target terminal, for example, the PPDU length may be determined by using the TXOP length or the data amount (PPDU length or the like) notified from the target terminal. The PPDU length may be determined on the basis of the terminal having the longest TXOP or the data amount among the target terminals, for example. Details will be described along with explanation for generating a trigger frame.

In selection of the target terminal, assignment of the resources, and determination of other parameter information, when the notification information has been notified from the terminal through the existing field, the base station may carry out scheduling by using the information stored in the existing field.

When execution contents of UL-MU communication such as the target terminals of the UL-MU communication, the resources to be assigned to the target terminals or the like are determined, the base station generates trigger frame 507.

Here, trigger frame 507 may be defined on the basis of the format of a general MAC frame illustrated in FIG. 5. As an example, it may be so configured that a type of the Frame Control field is a value indicating a control frame and a value of a subtype is a value newly defined for the trigger frame. However, the frame type of the trigger frame is not a control frame but configuration that it is a management frame or a data frame is not excluded. Moreover, a value in the existing standard may be used for the value of the subtype. Information required as a role of trigger frame 507 may be added as an information element to the Frame Body field of the existing management frame, for example.

The RA (receiver address) of trigger frame 507 may be a broadcast address or a multicast address and the address may be set in the address 1 field as an example. Moreover, TA (transmitter address) may be a MAC address or a BSSID of the base station.

Figure 11A:
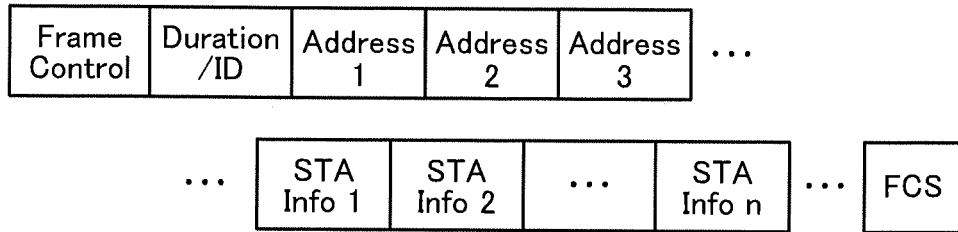
FIGS. 11A and 11B illustrate a format example of a trigger frame.

In the Frame Body field of the trigger frame, terminal information fields (STA Info. Fields) are set according to the number of target terminals in UL-MU transmission as illustrated in FIG. 11A. In a sequence example in FIG. 7, since terminals 1 to 4 are selected, four terminal information field (STA info fields) 1 to 4 are set. Information to be individually notified to the terminal is set in each terminal information field. An example of the information to be set in the terminal information field is shown below.

As an example, an identifier of the selected terminal is set in the terminal information field. The identifier of the terminal may be a MAC address of the terminal, an association ID (AID) or any other unique IDs between the terminals.

Moreover, parameter information individually used by the terminal in UL-MU transmission may be set in the terminal information field. Examples of the parameter information are shown below.

As an example of the parameter information, at least one of a data length allowed for transmission, an error correcting code scheme, and an MCS (Modulation and Coding Scheme) prescribing transmission rate of PHY or MAC or the both of them may be used. The data length may be a physical packet length or when the physical header length is fixed, it may be a MAC frame length or a MSDU length or may be a length of another portion. A unit of the data length may be a data size or a time length (occupied time length in a space). The data length may be common to each terminal or differences among terminals may be allowed. A maximum value of the data length (PPDU length or the like) may be determined in advance by a standard or a system and in this case, the data size is specified within a range of the maximum value.

When the base station determines the data length (PPDU length, for example), it may estimate or calculate the largest PPDU length among the target terminals, for example, and may set the largest PPDU length as a data length of uplink transmission. Alternatively, when the base station selects the target terminals, it may select terminals having the same or close PPDU length to each other on the basis of the PPDU length required by the terminals. When the PPDU length to be transmitted is different depending on the terminals, after completion of the transmission of the terminals with a short of PPDU length, a waste is caused in the resource assigned to the terminal with the short of PPDU length until completion of transmission of the terminal with a longer PPDU length, which might cause deterioration of system efficiency. Thus, by selecting the terminals with a close PPDU length, the system efficiency can be improved.

Moreover, the base station may determine an MCS of each target terminal and specify information of the MCS in the terminal information field so that the PPDU length of each target terminal carrying out UL-MU communication becomes equal or close to each other. Even in the case of the same data size, for example, the occupied time length is different if the applied MCS is different. Thus, when the data size of each terminal is different, the occupied time length of PPDU of each terminal may be brought to the same or close to each other by adjusting the MCS. Regarding the MCS, in addition to the MCS applied to the MAC frame, if the MCS can be specified to a part of or all of the fields of the physical header, the MCS may be specified to the field of the physical header.

As another example of the parameter information, information of a data type to be transmitted by each terminal may be designated. As the data type, information of an access category (AC) or traffic information (TID: Traffic ID) may be set. The designated data type may be different for each terminal or may be common to the terminals. Moreover, a plurality of data types may be designated to one terminal.

As still another example of the parameter information, information relating to the UL-MU communication scheme may be designated. When a mechanism that the base station designates either of OFDMA or MU-MIMO and causes the terminal to carry out UL-MU transmission is employed, for example, information designating either of the OFDMA or MU-MIMO is designated. The terminal carries out the UL-MU transmission in a communication scheme designated by the trigger frame. In this case, the base station may obtain the communication scheme which can be handled by each terminal in the association process with the terminal or an arbitrary timing after that and select the target terminals from the terminals compliant to the communication scheme to be used.

Moreover, as still another example of the parameter information, information designating one or a plurality of resources assigned to the terminal may be set in the terminal information field in accordance with the communication scheme of UL-MU to be used. In the case of UL-OFDMA, for example, the information designating one or a plurality of resource blocks assigned to the terminal may be set in the terminal information field. A format of the information designating the resource block may be any format as long as it can specify the resource block. Designation may be made by a number of the resource block, for example. The designation may be made by the number in the order of the resource block from a high frequency side or from a low frequency side. In the case of the UL-MU-MIMO transmission, information designating streams assigned to the terminal such as information of patterns of preambles (preambles for estimating propagation path response) to be added to a frame may be designated as an example. At this time, the preambles of each terminal are assumed to be selected to be orthogonal between the terminals (details will be described later). In the case of the UL-MU-MIMO transmission, the number of streams allowed for each terminal may be designated. The number of streams that can be handled by each terminal is assumed to have been obtained by the base station in advance as capability information of the terminal.

Figure 11B:
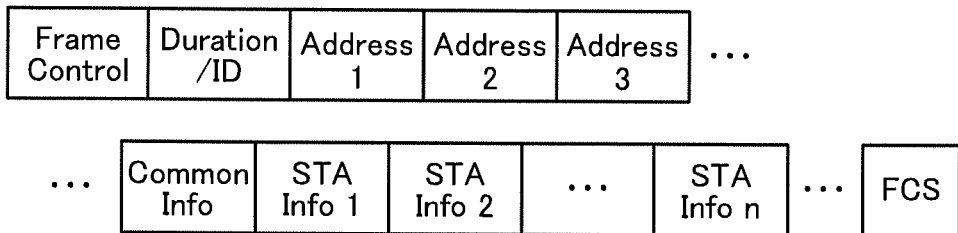

In a Frame Body field of the trigger frame, a common information field for notifying information (Common Information) common to the target terminals may be provided separately from the terminal information field as illustrated in FIG. 11 B. In the common information field, information to be notified in common to the target terminals is set. When the transmission data size to be designated to each terminal is common, for example, it may be set to the common information field, not in the terminal information field. The UL-MU communication scheme to be used may be set not in the terminal information field but in the common information field. Moreover, when a group is selected as a plurality of the target terminals, a group ID of the group may be designated in the common information field. At this time, when all the terminals belonging to the group are the target terminals, setting of identifiers of the individual terminals in the terminal information field may be omitted. However, it is assumed that each terminal grasps what number of the terminal information fields is assigned to the terminal itself has been notified from the base station in advance.

Figure 12:
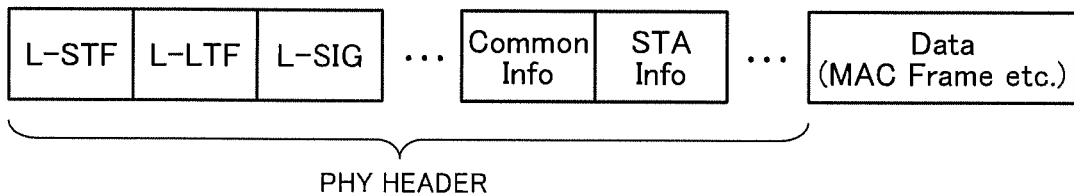
FIG. 12 is a diagram illustrating a format example of a physical packet including the trigger frame.

Here, the example in which the terminal information field and the common information field are set in the Frame Body field is illustrated, but a part of or the whole of the information to be set in the terminal information field and the common informant field may be arranged in the MAC header. Moreover, a part of or the whole of the information to be set in the terminal information field and the common information field may be arranged in the physical header as illustrated in FIG. 12. The physical header in FIG. 12 includes L-STF (Legacy-Short Training Field), L-LTF (Legacy-Long Training Field), L-SIG (Legacy Signal Field), the common information field, and the terminal information field. The terminal information field includes a field for the number of terminals. L-STF, L-LTF, and L-SIG are fields that can be recognized by a legacy standard such as IEEE 802.11a, and information such as signal detection, frequency correction, transfer speed and the like is stored. When all the required information is set to the terminal information field or the common information field in the physical header or to both of them, the terminal information field and the common information field may be omitted from the MAC frame.

Terminals 1 to 4 which received trigger frame 507 from the base station and are designated by trigger frame 507 transmit data frames 509, 510, 511, and 512 including the data for uplink transmission (to be more precise, the physical packets including the data frames) to the base station after certain time T1 from completion of the reception of trigger frame 507. The transmission of data frames 509 to 512 is carried out by using the resource (resource block or spatial resource (corresponding to a preamble pattern)) designated by trigger frame 507. The transmission timings of the data frames transmitted by terminals 1 to 4 are synchronized with each other, and as a result, data frames 509 to 512 transmitted from terminals 1 to 4 are transmitted by frequency multiplexing or spatial multiplexing. When there is no data to be transmitted to the base station, terminals 1 to 4 may transmit a frame in a format determined in advance, that is, Null Packet, for example. The Null Packet refers to a frame without a Body field. Alternatively, it may be so configured that terminals 1 to 4 do not transmit anything when there is no data to be transmitted to the base station. When the base station receives the Null Packet or it does not receive anything, it may be so determined that the terminal has no data to transmit.

Here, the certain time T1 in FIG. 7 may be SIFS (Short Inter-frame Space) time (=16 μs) which is a time interval between the frames defined in the MAC protocol specification of IEEE 802.11 wireless LAN as an example or may be longer than that. A value of the certain time T1 is stored in the common information field, and terminals 1 to 4 may obtain the value of the certain time T1 from the common information field. Besides, the certain time T1 may be notified in advance by another method such as a beacon frame or other management frames.

When there is a condition designated in the terminal information field and the common information field, terminals 1 to 4 generate and transmit data frames (to be more precise, generation and transmission of a physical packet including a data frame) so that the condition is satisfied.

When information of an access category (AC) to be transmitted by each terminal is designated by trigger frame 507, for example, data belonging to the designated AC (hereinafter referred to as designated AC) (it is assumed to be MSDU, here) is selected, and a data frame including the MSDU is transmitted. When the data frame to be transmitted can include a plurality of MSDUs in the data frame such as an aggregation frame, or when a plurality of resources is designated and the MSDU can be transmitted for each resource or when there is no MSDU belonging to the designated AC, the MSDU belonging to AC other than the designated AC (hereinafter referred to as non-designated AC) may be included. At this time, how many MSDUs are to be selected from the designated AC and the non-designated AC, respectively, or which AC in the non-designated AC is to be selected may be determined by an arbitrary method. As an example, at least one MSDU belonging to the designated AC may be selected, while MSDU may be selected from each AC freely other than that. When the AC is designated by trigger frame 507, the above-described function of EDCA (function of transmission by the AC which acquires the access right the fastest by carrying out the procedure of CSMA/CA independently by each AC) does not have to be carried out for the time being, or a parameter of EDCA may be forcedly set to a predetermined value so as to control such that the AC can acquire the access right reliably.

Moreover, when a condition relating to the data length such as the PPDU length is designated by trigger frame 507, the data frame is generated and transmitted so that the condition of the data length is satisfied. When the PPDU length does not satisfy the designated value, for example, padding data may be added to the end of the MAC frame or for the time of shortage, no data may be transmitted (null data may be transmitted). When the MCS is designated by the trigger frame, the target terminal applies the designated MCS and generates the MAC frame or the physical packet.

The base station receives data frames 509 to 512 (to be more precise, the physical packets including the data frames) transmitted from terminals 1 to 4 by OFDMA or MU-MIMO. In the case of OFDMA, the data frames transmitted from terminals 1 to 4 are received by the respective resource blocks, while in the case of MU-MIMO, the data frame of each terminal is received from each stream. When the base station correctly receives the data frame transmitted from each terminal, it transmits an acknowledgement response frame 513 to terminals 1 to 4 after elapse of SIFS time from reception of each data frame. The SIFS time is an example and it may be time defined separately (IFS).

As the transmission of acknowledgement response frame 513, for example, the BA frame is transmitted by the resource block by which respective data frame was received for each of the terminals. When the data frame transmitted to the base station includes not an A-MPDU but a conventional (single) MPDU, an ACK frame may also be used in place of the BA frame (it is considered here that it is possible to return a BA frame in the case of a conventional MPDU). In this manner, transmission of the BA (or ACK) frames in respective resource blocks for each of the terminals corresponds to transmission of the acknowledgement response frames in downlink OFDMA. In this case, each terminal receives the BA (or ACK) frame by its own resource block (reception filters are set such that the signals can be received in this manner in units of the resource blocks). Alternatively, simultaneous transmission of the BA frame (or ACK frame) is possible for each terminal through each stream, respectively. That is, the acknowledgement response frames are transmitted in downlink MU-MIMO. The downlink MU-MIMO is defined by IEEE 802.11ac. It is not excluded, either, that the uplink transmission is OFDMA and the downlink transmission is MU-MIMO or the uplink transmission is MU-MIMO and the downlink transmission is OFDMA.

Alternatively, a single frame that includes all of the acknowledgement responses for terminals 1 to 4 may be transmitted (single user transmission). In this case, this frame may be called a Multi-STA BA frame. As a specific configuration, for example, Multi-TID BA frame defined by IEEE 802.11 standard may be diverted. As one example, the BA information fields of the Multi-TID BA frame are arranged in the number equal to the number of the terminals and the identifier of the terminal (for example, AID (Association ID) or part of the AID) is set in the reserved field in the TID information subfield of each BA information field. Values of the Block Ack Starting Sequence Control subfield and Block Ack Bitmap subfield of the of each BA information field should be set in a conventional manner in accordance with data frames 509 to 512 which the acknowledgement responses should be returned. A multicast address of the group to which all of terminals 1 to 4 belong or the broadcast address should be set in the RA (receiver address) of the Multi-STA BA frame. By this setting, the BA can be notified to a plurality of terminals by one single frame. Also, a new value may be defined for the Subtype of the Frame Control field.

In addition, when ACK frames are returned to terminals 1 to 4 instead of BA frames, identifiers of the terminals are set in some fields of the reserved fields within the TID information subfield of each BA information field, and a part of the remaining fields of the reserved fields are enabled (set bit(s) to 1(s)). In addition, when this bit is or these bits are enabled, the Block Ack Starting Sequence Control subfield and the Block Ack Bitmap subfield are omitted (do not exist). By virtue of this, ACKs of the plurality of terminals can be notified to the terminals by one single frame. The examples described herein are merely examples and existing frames other than the Multi-TID BA frame may be diverted, or a new frame may be defined without diverting the existing frames.

Here, the case where acknowledgement response frame 513 is transmitted to terminals 1 to 4 at once is illustrated, but a method of returning a BA frame or an ACK frame to terminals 1 to 4 in turn is also possible. When returning sequentially, such operations may be carried out in order that the BA frame is returned to the first terminal after completion of reception of the data frame which was uplink-transmitted to and from the second terminal onward, a BAR frame is transmitted, and the BA frame is transmitted as its response. Alternatively, from the second terminal onward, such operations may be repeated in order that the BA frame is transmitted without transmission of the BAR frame, and the ACK frame is received as a response. Which terminal is the first may be notified in the common information field or the terminal information field, etc. of trigger frame 507 or may be notified by another method. When being notified by trigger frame 507, implicit notification may be made that the terminal to which the first terminal information field is assigned is the first terminal or the like. The notification may be made by a method other than those described here.

After the transmission of the acknowledgement response frame 513, UL-MU transmission by terminals 1 to 4 and transmission of the acknowledgement response frame(s) by the base station may be carried out repeatedly.

As described above, a preamble for estimating a propagation path response of uplink may be added to the header of the physical packet to be UL-MU-MIMO transmitted by terminal 1, 2, 3, and 4. At this time, the preambles for the terminals are made to be orthogonal to each other. To be orthogonal means that an inner product of vectors having each value of a bit string in the preamble as a component becomes zero.

Figure 13:
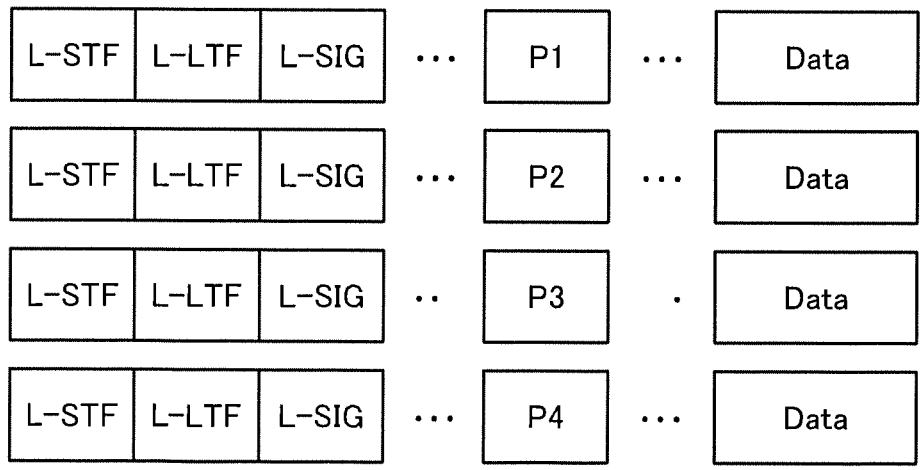
FIG. 13 is a schematic configuration diagram of the physical packet UL-MU-MIMO transmitted from a plurality of terminals.

FIG. 13 illustrates outline configuration of a physical packet to be UL-MU-MIMO transmitted by terminals 1 to 4. In the header of each physical packet, fields such as preambles 1 to 4 and the like are arranged other than L-STF, L-LTF, and L-SIG. The same value is set in each terminal in the fields of L-STF, L-LTF, L-SIG and the like before preambles 1 to 4. That is, information required for each terminal has been notified in advance from the base station so that the same value is set or it is determined in advance by the system or by the standard or both. The letter "L" in L-STF, L-LTF, and L-SIG represents a "legacy", and these fields are fields that can be recognized even by legacy terminals.

In the fields after preambles 1 to 4 (including the data field in which the MAC frame is stored), different contents (or may be the same contents) are set for each terminal. In the base station, the fields after preambles 1 to 4 are spatially separated between the terminals by using preambles 1 to 4. The base station may designate preamble patterns orthogonal to each other among terminals 1 to 4 in terminal information fields 1 to 4 in the notification frame.

The base station calculates propagation path information of the uplink between the antenna of each of terminals 1 to 4 and the plurality of antennas in the base station by using preambles 1 to 4 and decodes the field of each terminal after preambles 1 to 4 by using the calculated propagation path information. A field storing information relating to an MCS (Modulation and Coding Scheme) of each data field or the like may be separately arranged after preambles 1 to 4 in the header of the physical packet.

In a sequence example in FIG. 7, in terminals 1 to 4, the notification field in which the notification information is set is provided in the data frame, but the notification field may be provided in the management frame, for example. It may be an association request frame transmitted in the association process with the base station, may be an authentication request frame or may be any other types of the management frame. Moreover, provision of a notification field in the control frame other than the data frame and the management frame is not excluded. Moreover, as described above, the notification field in which the notification information is set may be provided not in a frame subjected to the single-user transmission but in a frame for the UL-MU transmission.

In the sequence example in FIG. 7, since the notification information has been transmitted by a frame (to be more precise, a physical packet including a frame) subjected to single-user transmission at an arbitrary timing from individual terminal to the base station, a large time gap may be caused between timing when the base station receives the notification information and timing when the base station determines start of UL-MU transmission. That is, long time can elapse from transmission of the last notification information by the terminal to the base station until the UL-MU communication is started. In this case, data for transmission may be no longer present in the terminal due to an operation of an application on the terminal side, time-out, or completion of data transmission by the single-user transmission. If such terminal is designated as the target terminal by the trigger frame, the resource (resource block or spatial resource (corresponding to the preamble pattern)) assigned to that terminal is wasted. Thus, when start of the UL-MU communication is determined, the base station may provide an inquiry phase before the transmission of the trigger frame so as to inquire whether there is a request for the UL-MU transmission from each terminal and select the target terminals from the terminals having the UL-MU transmission request. At this time, the terminals to be inquired on whether they have UL-MU transmission requests may be terminals which transmitted that they have UL-MU transmission requests in the notification information or transmitted the information that can specify that they have the request. As a result, the number of terminals to be inquired can be narrowed down and thus, an inquiry period can be reduced. Moreover, since a possibility of inquiry to a terminal not having an UL-MU transmission request is reduced, efficient inquiry can be realized.

Figure 14:
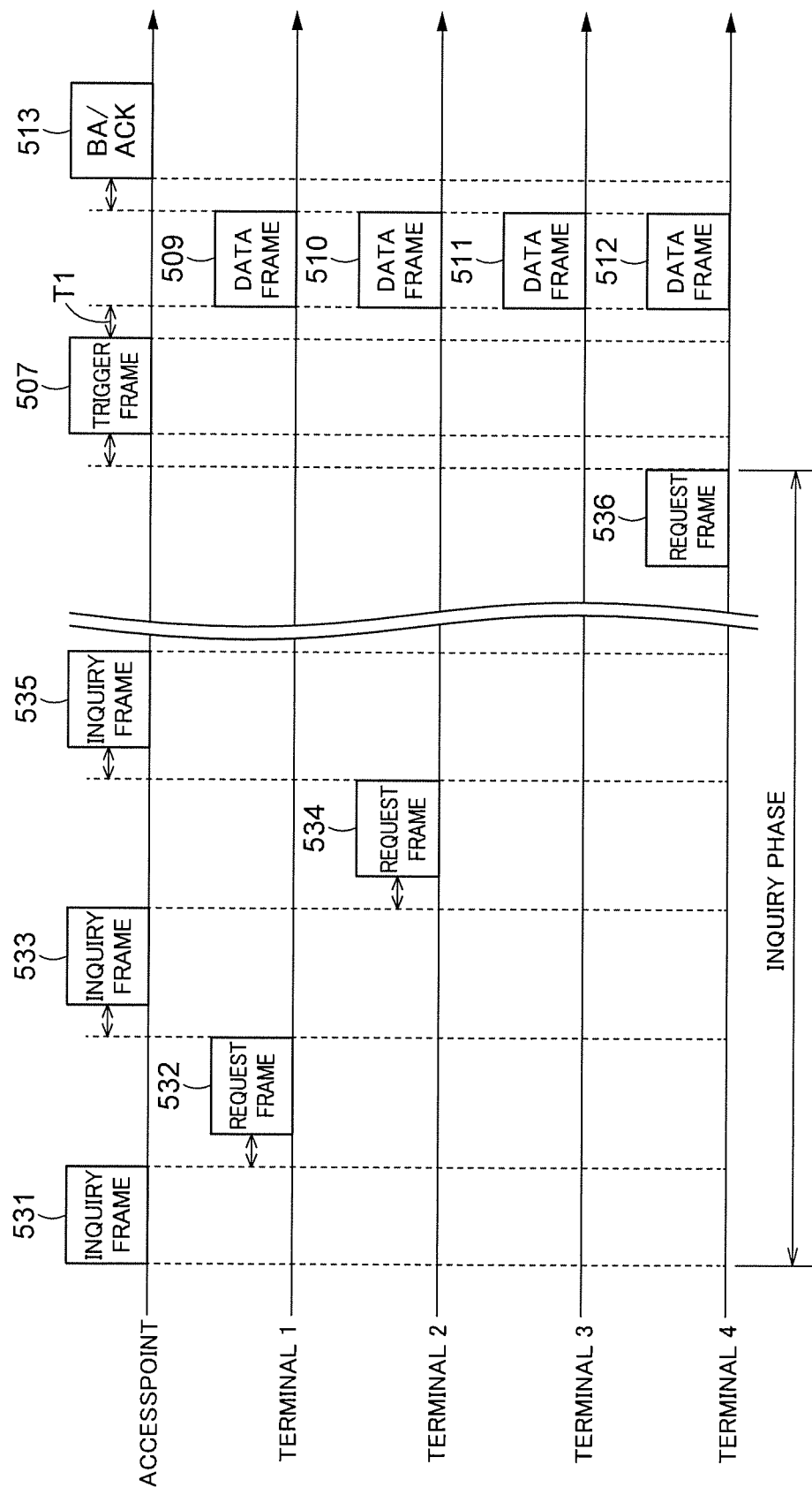
FIG. 14 is a diagram illustrating another example of the operation sequence according to the embodiment of the present invention.

FIG. 14 illustrates an example of an operation sequence of the inquiry phase carried out before transmission of the trigger frame. Before the inquiry phase, it is assumed that single-user communication is being carried out between the individual terminals and the base station as in before the transmission of the trigger frame in FIG. 7.

As illustrated in FIG. 14, when the base station determines start of UL-MU transmission, it determines a candidate terminal of the UL-MU transmission and transmits inquiry frame 531 to one of the candidate terminals (terminal 1, here). Terminal 1 transmits request frame 532 including information indicating presence of a request for UL-MU transmission after elapse of SIFS time from reception of inquiry frame 531.

Inquiry frame 531 and request frame 532 may be defined on the basis of a format of the general MAC frame illustrated in FIG. 5. The inquiry frame may be any one of the types of control frame, management frame, and data frame. As an example, the inquiry frame is a control frame. A value of a subtype may be newly defined for inquiry frame 531. The RA of inquiry frame 531 is a MAC address of terminal 1, and the TA is a BSSID or a MAC address of the base station. However, the RA may be given a broadcast address or multicast address, and an identifier of terminal 1 (AID or MAC address, etc.) may be set in the Frame Body field. If there is a condition for the UL-MU communication fixed at the current point of time (a communication scheme, for example) in the Frame Body field or the like, the condition may be set.

Request frame 532 may be any one of the types of control frame, management frame, and data frame. As an example, request frame 532 is a control frame. A value of a subtype may be newly defined for request frame 532. Request frame 532 includes information for specifying presence of a request for UL-MU transmission. As an example, a bit indicating presence of data for UL-MU transmission may be provided in a MAC header, a Body field or a physical header. Moreover, Request frame 532 may include the above-described notification information (see the first to ninth examples), and in this case, the latest notification information can be transmitted immediately before start of the UL-MU communication.

The base station also makes selection in order for the other candidate terminals and repeatedly carries out sets of transmission of an inquiry frame and reception of a request frame. In the illustrated example, inquiry frame 533 is transmitted to terminal 2 after terminal 1, and request frame 534 is received from terminal 2 after the SIFS time. Then, after the SIFS time from the reception of request frame 534, inquiry frame 535 is transmitted to terminal 3, and after the SIFS time, the request frame is received from terminal 3. After that, the inquiry frame is transmitted also to terminal 4, and after the SIFS time, request frame 536 is transmitted from terminal 4. There may be candidate terminals other than terminals 1 to 4, and the similar process may be carried out.

When the inquiry to all the candidate terminals is completed, the base station determines matters required for UL-MU transmission (selection of target terminals or the like), generates trigger frame 507 and transmits trigger frame 507. Configuration of trigger frame 507 and a sequence of the transmission of trigger frame 507 and after are similar to the case in FIG. 7 and the explanation will be omitted. In this sequence example, too, the notification field in which the notification information is set may be provided in the frame transmitted in UL-MU.

Figure 15:
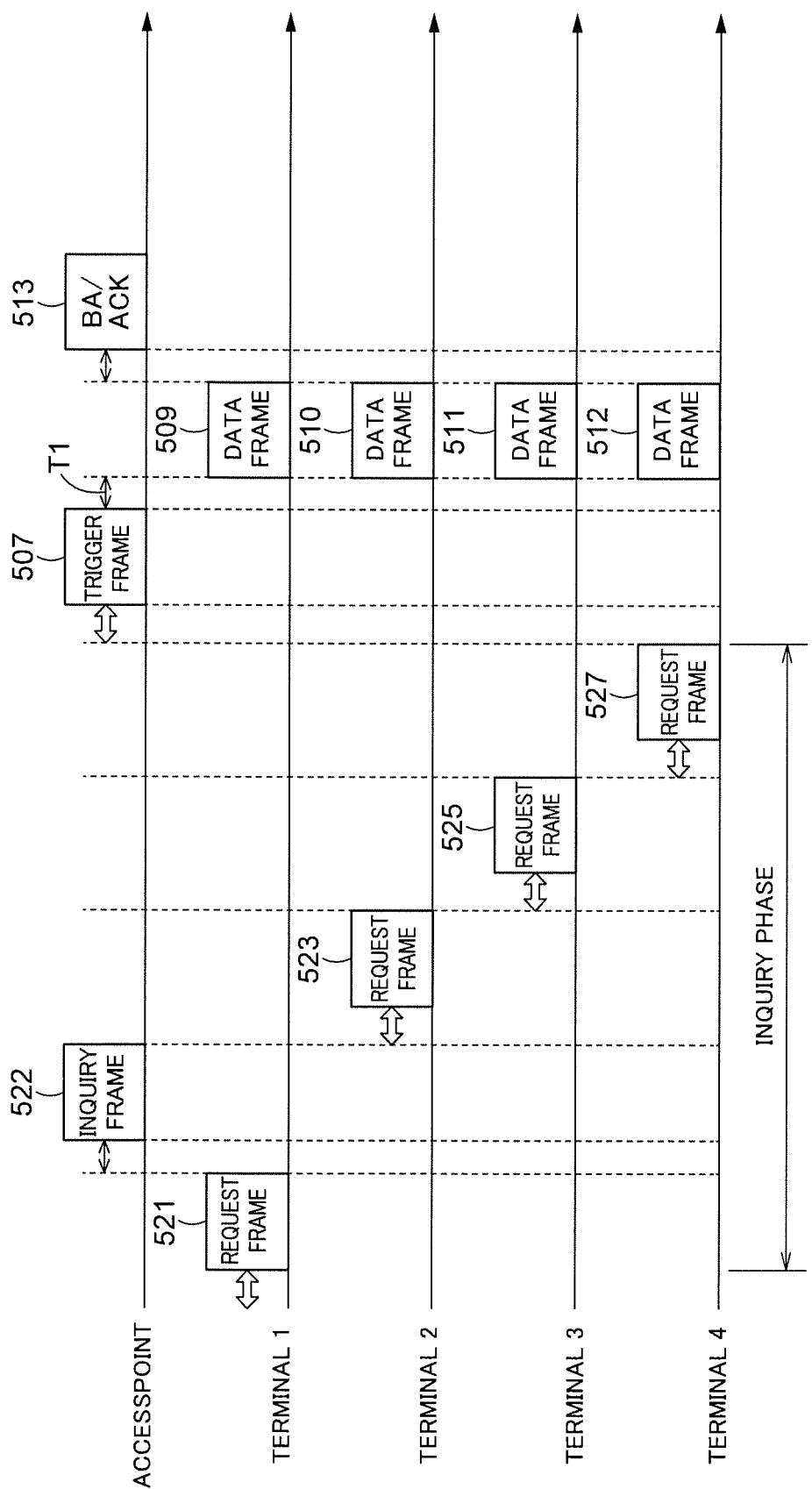
FIG. 15 is a diagram illustrating still another example of the operation sequence according to the embodiment of the present invention.

In a sequence example in FIG. 14, timing when the base station determines start of the UL-MU transmission (timing when the inquiry phase is started) is not particularly specified, but the base station can determine start of the UL-MU transmission in accordance with a request from the terminal. A sequence example of this case is illustrated in FIG. 15.

One of the terminals belonging to the BSS of the base station (terminal 1, here) transmits request frame 521. To be more precise, terminal 1 holds data for uplink transmission and acquires the access right in accordance with CSMA/CA. That is, during the carrier sense time (standby time) between the DIFS/AIFS[AC] time and a randomly defined backoff time, the carrier sense is carried out, and since a wireless medium is idle, the access right is acquired. It is assumed that the terminals 2 to 4 also hold the data for uplink transmission and acquisition of the access right is tried, but terminal 1 acquired the access right.

Terminal 1 transmits request frame 521 during TXOP based on the access right. Request frame 521 only needs to be defined similarly to the request frame used in the sequence example in FIG. 14. The base station determines start of the UL-MU transmission upon reception of request frame 521.

The base station selects candidate terminals for UL-MU communication from the terminals other than terminal 1 and transmits inquiry frame 522 including information designating the selected candidate terminal. To be more precise, the base station transmits inquiry frame 522 after the SIFS time from reception of request frame 521. Inquiry frame 522 may be any one of the types of the control frame, management frame, and data frame. As an example, inquiry frame 522 is a control frame. A value of a subtype may be newly defined for inquiry frame 522. As an example, the RA of inquiry frame 522 is a broadcast address or a multicast address, and the TA is a BSSID or a MAC address of the base station.

A field for designating the candidate terminal is provided in the Frame Body field, the MAC header or the physical header of inquiry frame 522, and information designating the candidate terminal is set in the field. A field storing an identifier of a candidate terminal (may be called a terminal ID field) is provided for the number of candidate terminals, for example, and the identifier of each selected candidate terminal (AID or MAC address, etc.) is set in each terminal ID field. Alternatively, a group ID of a group to which each candidate terminal belongs in common may be set in the field, and in this case, terminal 1 may belong to the group.

The terminal which received inquiry frame 522 confirms that the terminal itself is designated in inquiry frame 522. It determines whether the terminal itself is designated on the basis of whether the identifier of the terminal itself is set in any of the terminal ID field or on whether the terminal itself belongs to the group with the group ID set in the field, for example. If the terminal (excluding terminal 1) is designated as the candidate terminal, the access right is acquired on the basis of CSMA/CA, and the request frame is transmitted. In the illustrated example, each of terminals 2 to 4 acquires the access right and transmits request frames 523, 525, and 527.

When the base station has received the request frames from all the candidate terminals or when predetermined time has elapsed, it finishes the inquiry phase. When the base station finishes the inquiry phase, it determines matters required for UL-MU (selection of the target terminal and determination of the parameter information, etc.). The base station acquires the access right the wireless medium on the basis of CSMA/CA and transmits trigger frame 507 generated on the basis of the above-described determination. Since the sequence of the transmission of trigger frame 507 and after is similar to the case in FIG. 7, the explanation will be omitted. In this sequence example, too, the notification field in which the notification information is set may be provided in the frame transmitted in UL-MU.

The sequence examples of the inquiry phase illustrated in FIGS. 14 and 15 are mere examples, and a sequence other than those illustrated here may be also used. In the sequence example in FIG. 15, the base station does not return the acknowledgement response frame to request frames 523, 525, and 527, for example, but the acknowledgement response frame may be returned. In the sequence example in FIG. 14, the inquiry frame is sequentially transmitted to all the candidate terminals, but it may be so configured that the base station transmits the inquiry frame including information designating a plurality of the candidate terminals (identifier of each candidate terminal or a group ID, etc.) only once at the first, and the terminal designated by the inquiry frame sequentially transmits the request frame at an interval of SIFS time. In this case, this inquiry frame includes information specifying the order of the candidate terminals to which the request frame is to be transmitted, and since the order of the terminal itself is grasped from this information, and moreover from the request frame length (the request frame length such as a fixed length, etc. is assumed to be known in advance), timing of the request frame to be transmitted by the terminal itself may be also grasped. Alternatively, the order of the terminal itself may be indirectly grasped in accordance with where in the order of the fields storing the identifier in the inquiry frame the terminal itself is set. Various sequence examples can be considered as the inquiry phase other than those described here.

Moreover, as a variation of the sequence in FIG. 14 or 15, the terminals designated by the trigger frame can transmit transmission requests by UL-MU in response to the trigger frame. For example, each terminal transmits QoS Null data and includes the information of the transmission buffer (a data amount in the transmission buffer or the like) in the MAC header. In this case, the PPDU length of UL-MU designated by the trigger frame is limited by a maximum length of the MAC header, for example. In the trigger frame, information for notifying an intention of collection of the transmission requests may be set. The terminal designated by the trigger frame may transmit their transmission buffer information when this information is set. Naturally, the PPDU length longer than the maximum length of the MAC header may be designated, and in this case, the frame including the transmission request (transmission buffer information or the like) in the MAC header may be transmitted while the data adjusted to that size is included in the Frame Body field.

As another variation, the transmission buffer information may be included in each of the frames to which is transmitted by one or a plurality of terminals performing UL-MU by using a scheme called random access OFDMA which will be described later. At this time, the frame to be transmitted from the terminal is similar to the case of the above-described variation. When there is a transmission request, that is, when there is data for uplink transmission in the transmission buffer, the terminal randomly selects a resource block for which the terminal has not been designated (a resource block for which no terminal has been designated, that is, a resource block which can be used by an arbitrary terminal) by the trigger frame for random access which will be described later and transmits a frame including the transmission request through the selected resource block.

The random access OFDMA will be described. In the random access OFDMA, similarly to the case of the above-described UL-OFDMA, the base station transmits the trigger frame, and in response to this trigger frame, one or a plurality of the terminals simultaneously carries out uplink transmission. However, this trigger frame does not designate a terminal but designates only a resource block to be used. However, same terminal may be designated for some resource blocks while same terminal may not be designated for the other resource blocks in some cases. In any case, the terminal which received the trigger frame (terminal to which any resource block has not been designated, for example) selects and uses the resource block randomly from the resource blocks to which no terminal is designated (resource blocks with no terminal designated). The trigger frame including designation of the resource block with no terminal designated as above is called a trigger frame for random access in some cases. By using the trigger frame for random access as the trigger frame transmitted by the base station, the terminals not designated by the trigger frame can select the resource blocks randomly from the resource blocks with no terminal designated and can transmit frames. A method by which the terminal selects the resource block randomly may be an arbitrary method such as a method of selection by using random numbers. Configuration of the trigger frame for random access may be arbitrary as long as the resource block with no terminal designated can be expressed. In the format in FIG. 11A, for example, it may be so configured that a predetermined identifier (identifier not assigned to any terminal) and an identifier of the resource block are set instead of the identifier of the terminal in the STA Info field, and the resource block to which this predetermined identifier is set is interpreted to be the resource block with no terminal designated.

Figure 16:
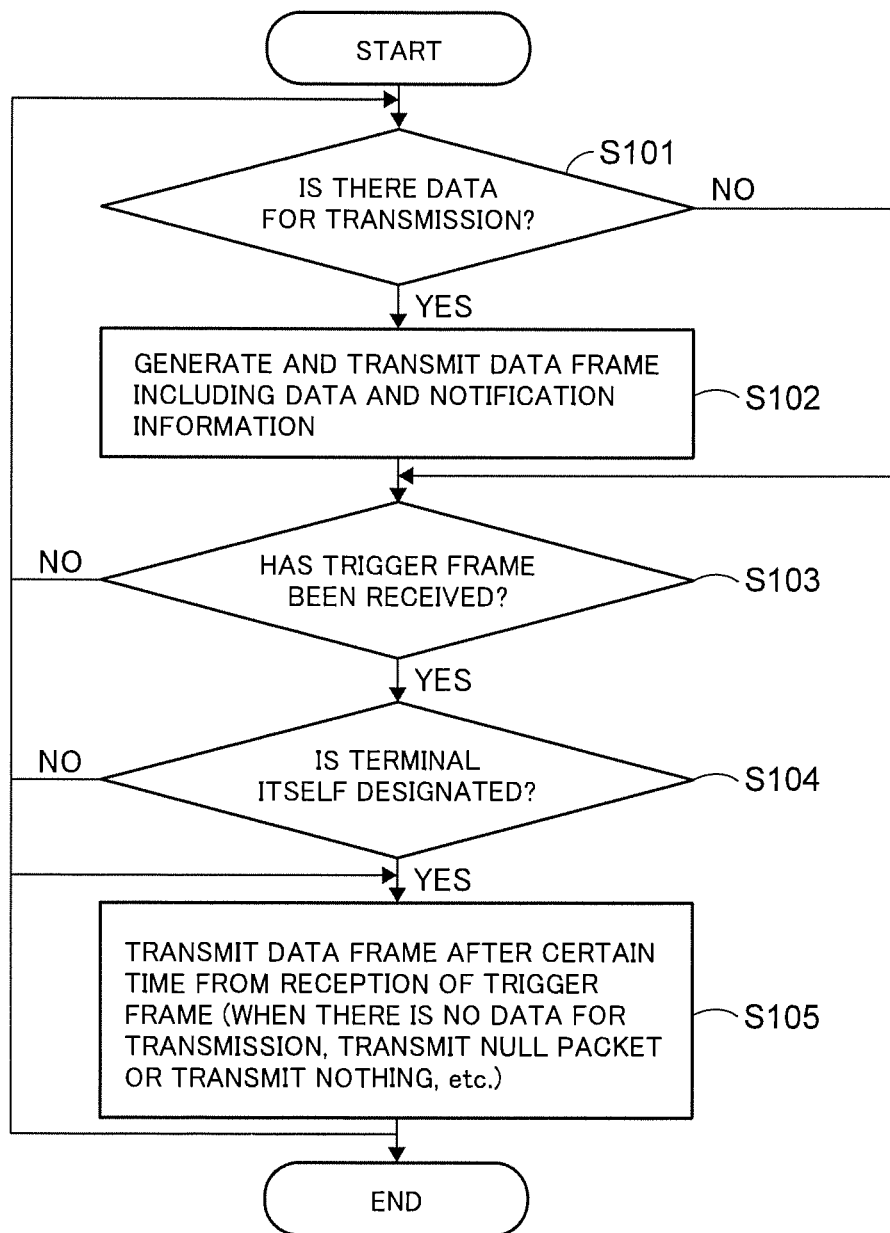
FIG. 16 is a diagram illustrating a flowchart of an example of an operation of a terminal according to the embodiment of the present invention.

FIG. 16 illustrates a flowchart of an exemplary operation of a terminal according to the embodiment of the present invention. This operation of the terminal corresponds to the operation of the terminal in the sequence example illustrated in FIG. 7. When the terminal holds data for transmission (YES at S101), it acquires the access right to the wireless medium in accordance with CSMA/CA, generates a data frame including the data and transmits the data frame (to be more precise, a physical packet including the data frame) during TXOP (S102). Here, the data frame or the physical header of the physical packet includes the above-described notification field, and in the notification field, notification information (see the notification information in the above-described first to ninth examples) is set. As described above, the notification information is stored in the data frame to be spontaneously transmitted by the terminal and is sent. That is, it is transmitted without receiving a transmission request for the notification information from the base station. In this example, the example in which the notification information is included in the data frame is illustrated, but the notification information can be included in the management frame or the control frame for transmission. While the terminal does not receive the trigger frame from the base station (NO at S103), it repeats processing similar to the above. When the terminal has received the trigger frame from the base station (YES at S103), it determines whether the terminal itself is designated as a target terminal of UL-MU transmission and if the terminal itself is designated (YES at S104), it transmits the data frame including data for transmission (to be more precise, a physical packet including the data frame) after certain time from completion of reception of the trigger frame (S105).

When a condition relating to the data to be transmitted or the data frame or the like is designated by the trigger frame, the data frame is generated and transmitted so as to satisfy the condition. When there is no data for transmission, Null Packet may be transmitted or nothing may be transmitted. Here, the data frame is transmitted, but the management frame or the control frame may be transmitted. The notification field in which the notification information is set may be provided in the data frame. The terminal receives the acknowledgement response frame from the base station after SIFS time from the transmission of the data frame. The terminal can be configured to further transmit the data frame after SIFS from the reception of the acknowledgement response frame.

Figure 17:
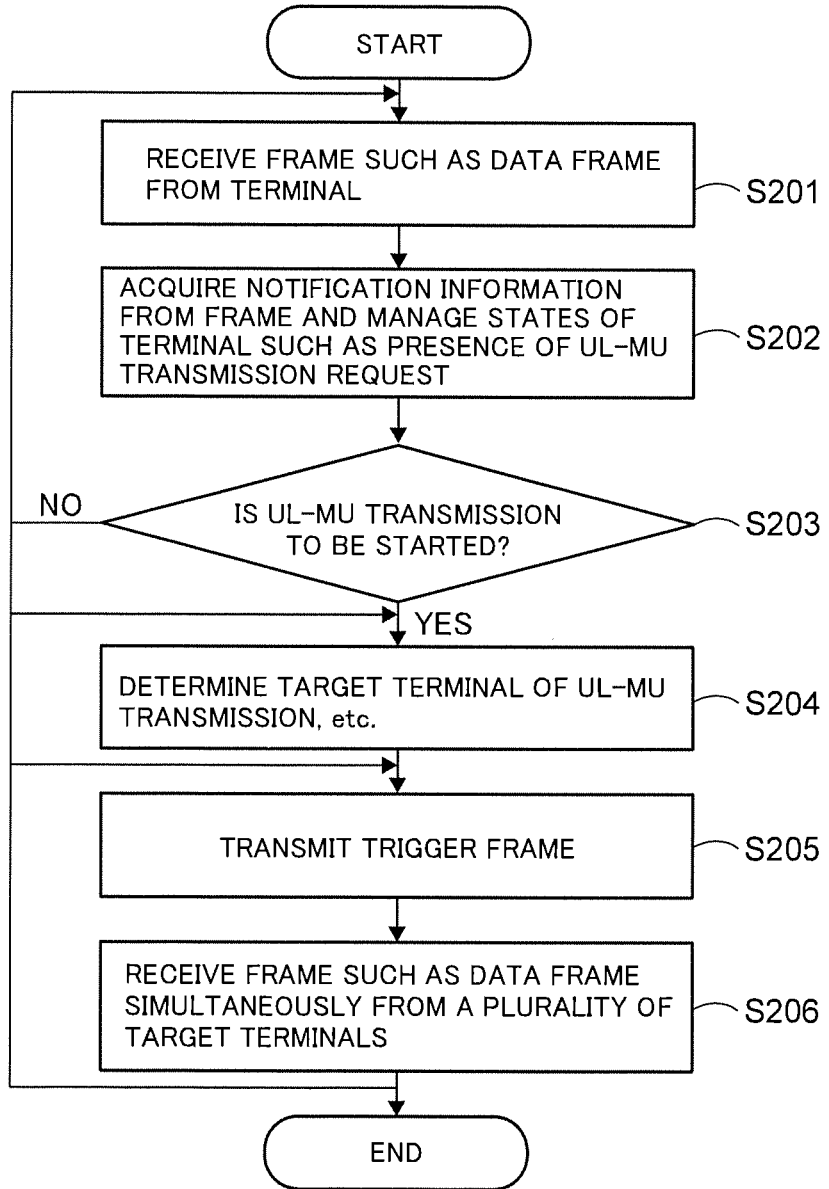
FIG. 17 is a diagram illustrating a flowchart of an example of an operation of a base station according to the embodiment of the present invention.

FIG. 17 illustrates a flowchart of an exemplary operation of the base station according to the embodiment of the present invention. This operation of the base station corresponds to the operation of the base station in the sequence example illustrated in FIG. 7. When the base station receives a frame such as data frame or the like from the terminal (S201), it acquires notification information from the frame (in the case of a frame with a notification field) and manages a state of the terminal such as presence of a request for UL-MU transmission on the basis of the notification information (S202). The base station repeats the above-described processing until it determines start of the UL-MU communication. When it determines start of the UL-MU communication (YES at S203), it determines required matters such as a target terminal of the UL-MU communication, parameter information at transmission or the like (S204) and transmits a trigger frame to the target terminal (S205). The base station receives the frame such as the data frame transmitted simultaneously from the target terminals after certain time from the transmission of the trigger frame (S206). The base station transmits an acknowledgement response frame to the target terminal after SIFS time from the reception of the frame. After that, the base station may return to processing of determination of required matters (S204) again, may return to the transmission processing of the trigger frame (S205) or may return to the reception processing of the UL-MU transmission (S206). Alternatively, it may return to processing of other steps such as Step S201. When the notification information is set in the frame transmitted in UL-MU from the terminal, the base station uses the notification information for determining the matters required for subsequent and later UL-MU transmissions.

Figure 18:
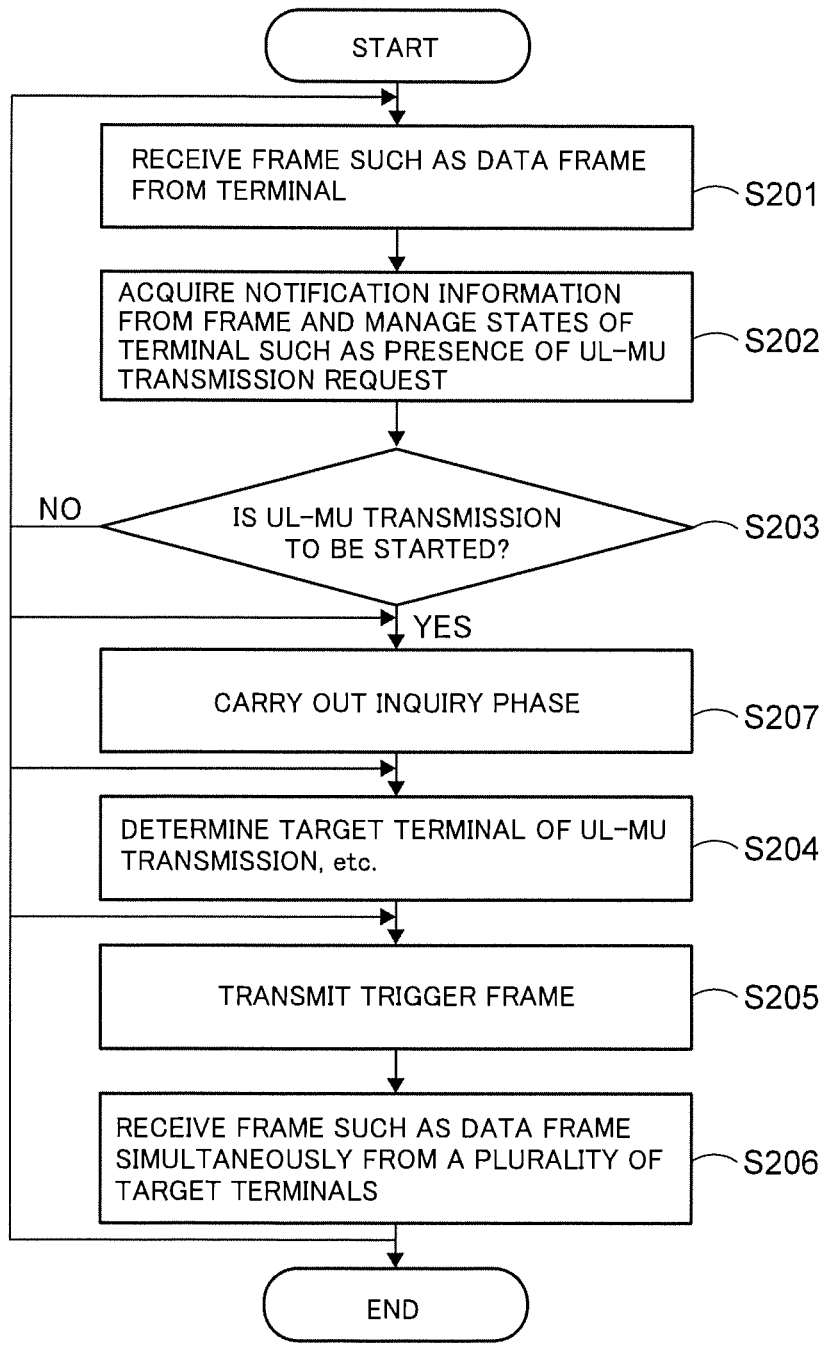
FIG. 18 is a diagram illustrating a flowchart of another example of an operation of the base station according to the embodiment of the present invention.

FIG. 18 illustrates a flowchart of another exemplary operation of the base station according to the embodiment of the present invention. A difference from FIG. 17 is that, after the base station determines start of the UL-MU transmission and before transmits the trigger frame, it carries out an inquiry phase (S207) as illustrated in FIG. 14 or 15. In the inquiry phase, candidate terminals carrying out the UL-MU transmission are selected, and an inquiry frame relating to presence of a request for carrying out the UL-MU communication or the like is transmitted to the selected candidate terminals on the basis of the notification information collected before the inquiry phase, for example. Then, the request frame notifying whether the terminal has a request for carrying out the UL-MU communication or the like is received from each of the candidate terminals. In determination of the required matters after the inquiry phase (S204), the target terminals are selected from the terminals having notified presence of a request for carrying out the UL-MU communication among the candidate terminals, for example. That is, it can be considered that rough estimation is made by the notification information collected before the inquiry phase, and estimation with higher accuracy is made by the inquiry during the inquiry phase. After the UL-MU transmission is carried out, it may return to the inquiry phase again or may return to processing of other steps.

In this embodiment, the notification information is transmitted for determining the required matters of the UL-MU communication but as a variation, it can be so configured that, in an HCCA environment, in order to determine a terminal which becomes a communication target of the base station or to determine TID for data transmission by the terminal, the notification information is transmitted from each terminal to the base station. In the HCCA environment, the base station transmits QoS CF-Poll frame to the terminal, and the terminal is allowed to transmit a frame during TXOP designated by the frame. TID is designated in the QoS CF-Poll frame. Thus, as a basis for determination of the base station to designate at least either one of the terminal or TID, each terminal can transmit the notification information according to at least one of the above-described first to ninth examples or an arbitrary combination of them.

As described above, according to this embodiment, the base station can efficiently collect notification information by transmitting a frame including notification information without reception of a request from the base station by each terminal. Moreover, by including the notification information in a frame (data frame, association request frame, etc.) to be single-user transmitted to the base station normally on the CSMA/CA basis, the base station can collect the notification information while each terminal suppresses lowering of system efficiency. Moreover, the base station can narrow down the terminals having data for uplink more reliably by providing the inquiry phase.

(Second Embodiment)

Figure 19:
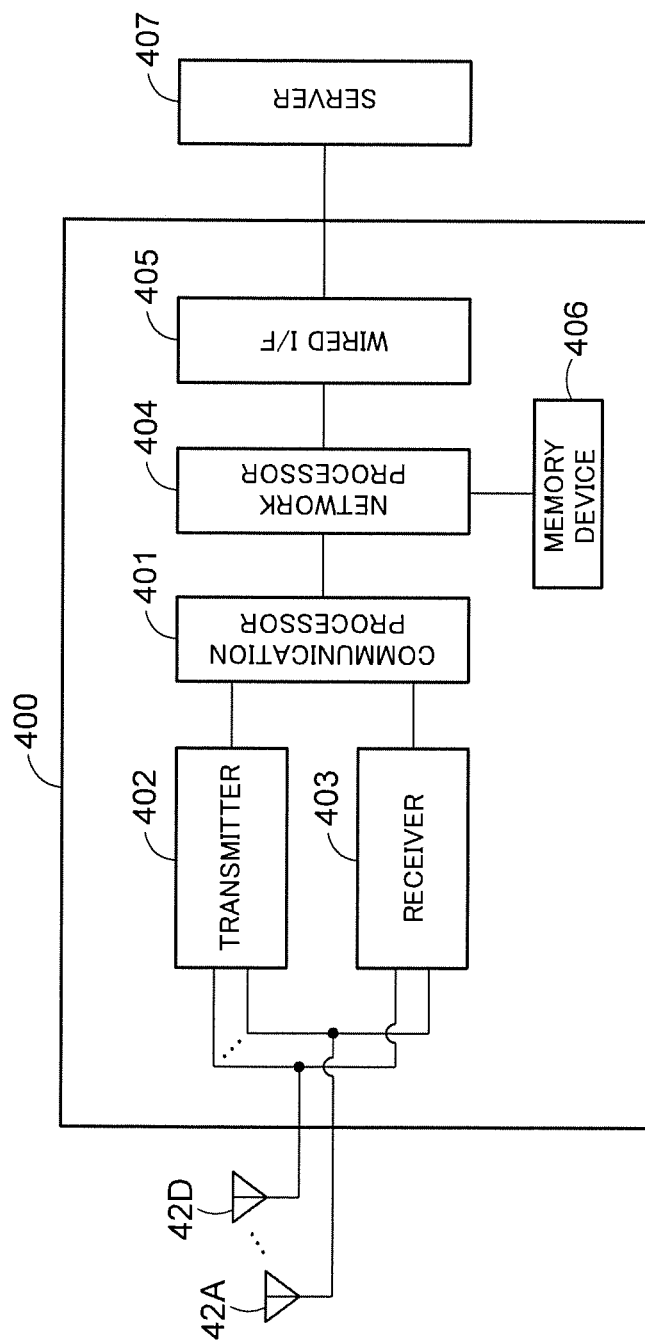
FIG. 19 is a functional block diagram of the base station or the terminal according to a second embodiment.

FIG. 19 is a functional block diagram of a base station (access point) 400 according to the second embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. The communication processor 401 has functions similar to MAC processor 10 and MAC/PHY manager 60 in the first embodiment. The transmitter 402 and the receiver 403 have functions similar to PHY processor 50 and analog processor 70 in the first embodiment. The communication processor 404 has functions similar to upper layer processor 90 in the first embodiment. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

A terminal (STA) with the cache function can also be realized by the same block configuration as FIG. 19. In this case, the wired I/F 405 may be omitted. The terminal according to the present embodiment can applied as the terminal in the first embodiment. For example, the terminal reads out the data cached in the memory 406 and transmits a data frame including the read data (specifically, a physical packet having a physical header added) to the base station. The data may be data acquired from the server 407 or data acquired in another method (data acquired from another external device or user-specified file data etc.). The terminal may generate notification information (control information) in each example in the first embodiment based on data for transmission to the base station, cached in the memory 406. The terminal may transmit the data for transmission to the base station, cached in the memory 406 by any of data frame 501, 503 and 505 or any of data frames 509 to 512 in FIG. 7. The terminal may transmit the generated notification information by any of data frame 501, 503 and 505, or any of data frames 509 to 512 by uplink multi-user transmission in FIG. 7.

In the case of the multi-hop network, the terminal has a role of a non-base station terminal and a role of a base station. When the terminal operates as the base station, the terminal transfers data having received from another terminal to another base station, and for this reason, the terminal may cache the received data in the memory.

The base station according to the present invention can be applied for the base station in the first embodiment. In this case, the following operation can be carried out. The base station reads out the data for transmission to a terminal from the memory 406 and generates and transmits a frame including the read data (a trigger frame, an inquiry frame or data frame etc.). The base station may add data for transmission each terminal in the memory 406 to a frame such as the trigger frame. The data for transmission each terminal in the memory 406 is not limited to data acquired based on a data transfer request from each terminal and may be data transmitted from the server 407 or an external device except the server 407 regardless the data transfer request. For example, the data may be push data addressed to each terminal or e-mail data. The base station may transmit data for transmission to a plurality of terminals in the memory 406 by downlink multi-user scheme (DL-OFDMA, DL-MU-MIMO or a combination thereof (such as DL-OFDMA&DL-MU-MIMO).

(Third Embodiment)

Figure 20:
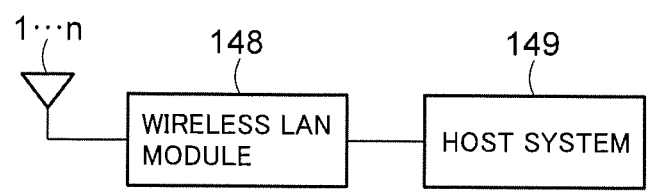
FIG. 20 illustrates an overall configuration example of the terminal or the base station according to a third embodiment.

FIG. 20 shows an example of entire configuration of a terminal or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to the first embodiment. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device and so on.

Figure 21:
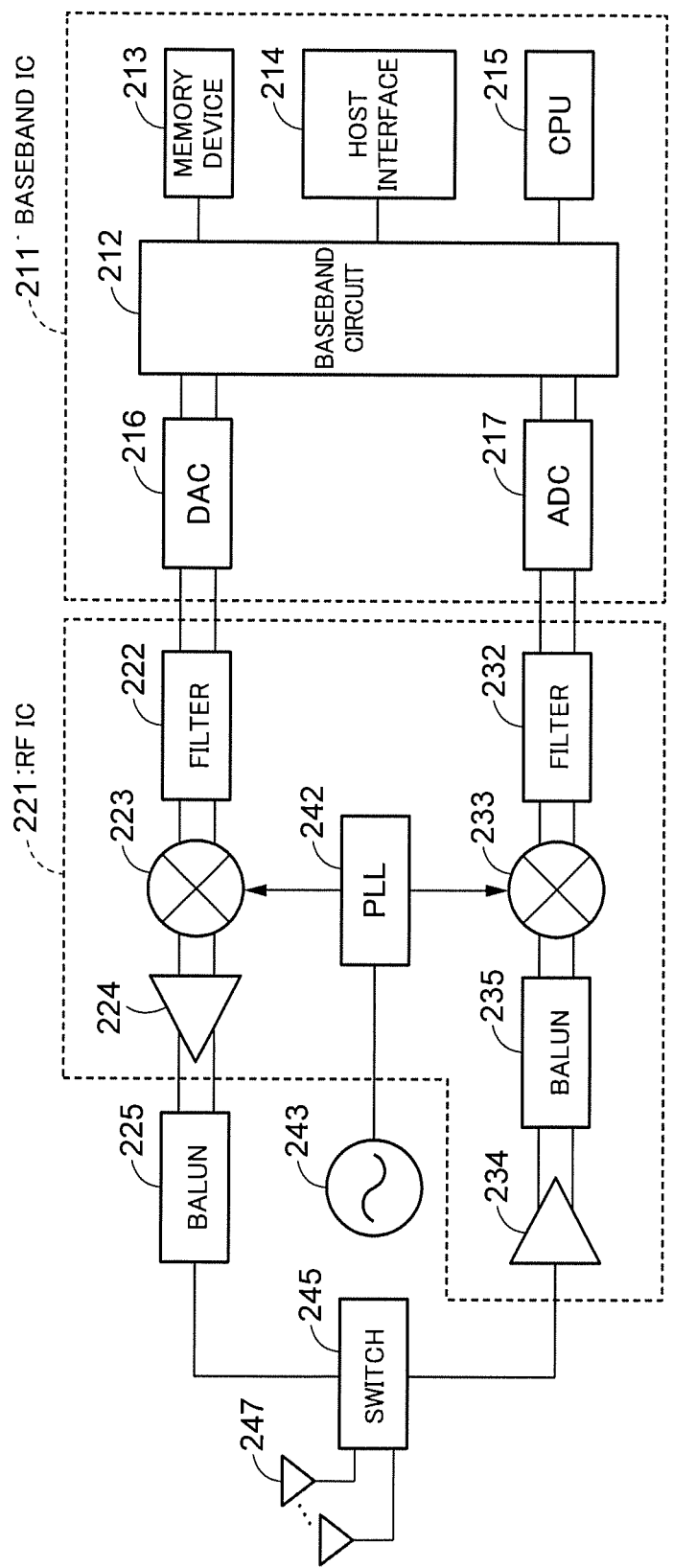
FIG. 21 is a diagram illustrating a hardware configuration example of a wireless communication device mounted on the base station or the terminal according to the third embodiment.

FIG. 21 shows an example of hardware configuration of a WLAN module. The configuration shown in the figure may be applied for each case in where the wireless communication device is mounted in non-AP terminal or in AP (Access Point) provided correspondingly to each function. That is, the configuration can be applied as specific examples of the wireless communication device in FIG. 1. In the configuration shown in figure, at least one antenna is included although a plurality of antennas are included. In this case, a plurality of sets of a transmission system (216 and 222 to 225), a reception system (217, 232 to 235), a PLL 242, a crystal oscillator (reference signal source) 243, and a switch 245 may be arranged according to the antennas, and each set may be connected to a control circuit 212. One or both of the PLL 242 and the crystal oscillator 243 correspond to an oscillator according to the present embodiment.

The wireless LAN module (wireless communication device) includes a baseband IC (Integrated Circuit) 211, an RF (Radio Frequency) IC 221, a balun 225, the switch 245, and the antenna 247.

The baseband IC 211 includes the baseband circuit (control circuit) 212, a memory 213, a host interface 214, a CPU 215, a DAC (Digital to Analog Converter) 216, and an ADC (Analog to Digital Converter) 217.

The baseband IC 211 and the RF IC 221 may be formed on the same substrate. The baseband IC 211 and the RF IC 221 may be formed by one chip. Both or one of the DAC 216 and the ADC 217 may be arranged on the RF IC 221 or may be arranged on another IC. Both or one of the memory 213 and the CPU 215 may be arranged on an IC other than the baseband IC.

The memory 213 stores data to be transferred to and from the host system. The memory 213 also stores one or both of information to be transmitted to the terminal or the base station and information transmitted from the terminal or the base station. The memory 213 may also store a program necessary for the execution of the CPU 215 and may be used as a work area for the CPU 215 to execute the program. The memory 213 may be a volatile memory, such as an SRAM or a DRAM, or may be a non-volatile memory, such as a NAND or an MRAM.

The host interface 214 is an interface for connection to the host system. The interface can be anything, such as UART, SPI, SDIO, USB, or PCI Express.

The CPU 215 is a processor that executes a program to control the baseband circuit 212. The baseband circuit 212 mainly executes a process of the MAC layer and a process of the physical layer. One or both of the baseband circuit 212 and the CPU 215 correspond to the communication control apparatus that controls communication, the controller that controls communication, or controlling circuitry that controls communication.

At least one of the baseband circuit 212 or the CPU 215 may include a clock generator that generates a clock and may manage internal time by the clock generated by the clock generator.

For the process of the physical layer, the baseband circuit 212 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 216 performs DA conversion of signals input from the baseband circuit 212. More specifically, the DAC 216 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 221 is, for example, one or both of an RF analog IC and a high frequency IC. The RF IC 221 includes a filter 222, a mixer 223, a preamplifier (PA) 224, the PLL (Phase Locked Loop) 242, a low noise amplifier (LNA) 234, a balun 235, a mixer 233, and a filter 232. Some of the elements may be arranged on the baseband IC 211 or another IC. The filters 222 and 232 may be bandpass filters or low pass filters.

The filter 222 extracts a signal of a desired band from each of the analog I signal and the analog Q signal input from the DAC 216. The PLL 242 uses an oscillation signal input from the crystal oscillator 243 and performs one or both of division and multiplication of the oscillation signal to thereby generate a signal at a certain frequency synchronized with the phase of the input signal. Note that the PLL 242 includes a VCO (Voltage Controlled Oscillator) and uses the VCO to perform feedback control based on the oscillation signal input from the crystal oscillator 243 to thereby obtain the signal at the certain frequency. The generated signal at the certain frequency is input to the mixer 223 and the mixer 233. The PLL 242 is equivalent to an example of an oscillator that generates a signal at a certain frequency.

The mixer 223 uses the signal at the certain frequency supplied from the PLL 242 to up-convert the analog I signal and the analog Q signal passed through the filter 222 into a radio frequency. The preamplifier (PA) amplifies the analog I signal and the analog Q signal at the radio frequency generated by the mixer 223, up to desired output power. The balun 225 is a converter for converting a balanced signal (differential signal) to an unbalanced signal (single-ended signal). Although the balanced signal is handled by the RF IC 221, the unbalanced signal is handled from the output of the RF IC 221 to the antenna 247. Therefore, the balun 225 performs the signal conversions.

The switch 245 is connected to the balun 225 on the transmission side during the transmission and is connected to the LNA 234 or the RF IC 221 on the reception side during the reception. The baseband IC 211 or the RF IC 221 may control the switch 245. There may be another circuit that controls the switch 245, and the circuit may control the switch 245.

The analog I signal and the analog Q signal at the radio frequency amplified by the preamplifier 224 are subjected to balanced-unbalanced conversion by the balun 225 and are then emitted as radio waves to the space from the antenna 247.

The antenna 247 may be a chip antenna, may be an antenna formed by wiring on a printed circuit board, or may be an antenna formed by using a linear conductive element.

The LNA 234 in the RF IC 221 amplifies a signal received from the antenna 247 through the switch 245 up to a level that allows demodulation, while maintaining the noise low. The balun 235 performs unbalanced-balanced conversion of the signal amplified by the low noise amplifier (LNA) 234. The mixer 233 uses the signal at the certain frequency input from the PLL 242 to down-convert, to a baseband, the reception signal converted to a balanced signal by the balun 235. More specifically, the mixer 233 includes a unit that generates carrier waves shifted by a phase of 90 degrees based on the signal at the certain frequency input from the PLL 242. The mixer 233 uses the carrier waves shifted by a phase of 90 degrees to perform quadrature demodulation of the reception signal converted by the balun 235 and generates an I (In-phase) signal with the same phase as the reception signal and a Q (Quad-phase) signal with the phase delayed by 90 degrees. The filter 232 extracts signals with desired frequency components from the I signal and the Q signal. Gains of the I signal and the Q signal extracted by the filter 232 are adjusted, and the I signal and the Q signal are output from the RF IC 221.

The ADC 217 in the baseband IC 211 performs AD conversion of the input signal from the RF IC 221. More specifically, the ADC 217 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 212 executes a process of the physical layer and the like, such as demodulation process, error correcting code process, and process of physical header, and obtains a frame. The baseband circuit 212 applies a process of the MAC layer to the frame. Note that the baseband circuit 212 may be configured to execute a process of TCP/IP when the TCP/IP is implemented.

(Fourth Embodiment)

Figure 22A:
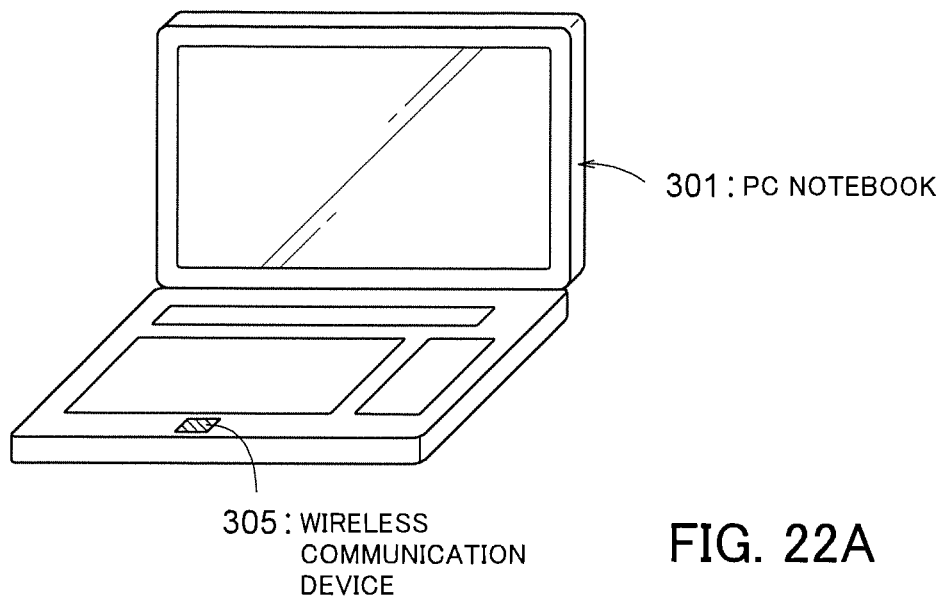
FIGS. 22A and 22B show a perspective view of a wireless communication terminal in accordance with the embodiment of the present invention.
Figure 22B:
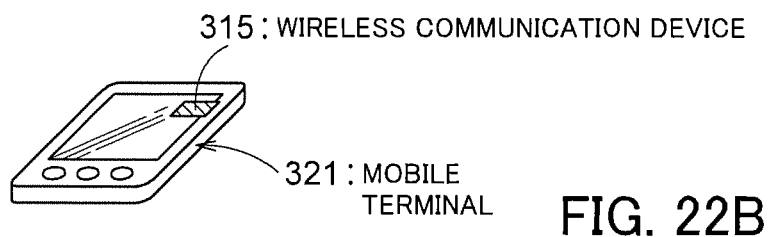

FIG. 22A and FIG. 22B are perspective views of wireless terminal according to the present embodiment. The wireless terminal in FIG. 22A is a notebook PC 301 and the wireless communication device (or a wireless device) in FIG. 22B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 23:
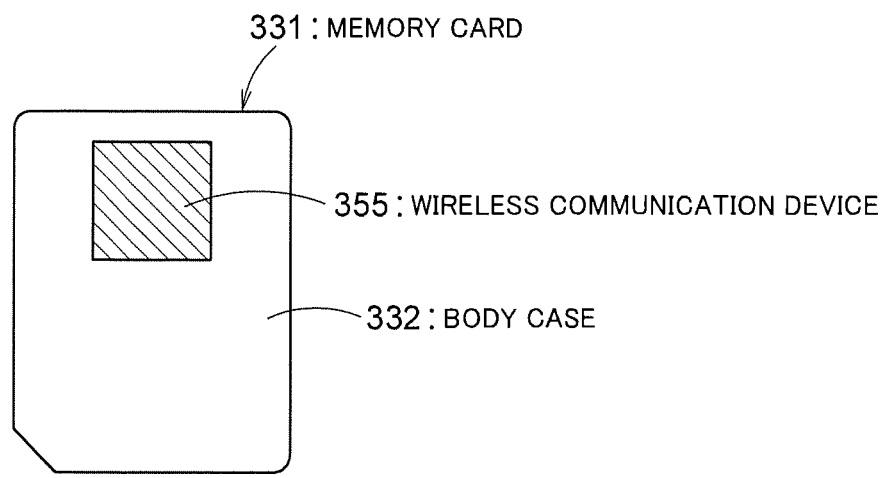
FIG. 23 is a diagram illustrating a memory card in accordance with the embodiment of the present invention.

Moreover, a wireless communication device installed in a terminal (which may indicate a base station) can also be provided in a memory card. FIG. 23 illustrates an example of a wireless communication device mounted on a memory card. A memory card 331 contains a wireless communication device 355 and a body case 332. The memory card 331 uses the wireless communication device 355 for wireless communication with external devices. Here, in FIG. 23, the description of other installed elements (for example, a memory, and so on) in the memory card 331 is omitted.

(Fifth Embodiment)

In the present embodiment, a bus, a processor unit and an external interface unit are provided in addition to the configuration of the wireless communication device according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

(Sixth Embodiment)

In the present embodiment, a clock generating unit is provided in addition to the configuration of the wireless communication device according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

(Seventh Embodiment)

In the present embodiment, a power source unit, a power source controlling unit and a wireless power feeding unit are included in addition to the configuration of the wireless communication device according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

(Eighth Embodiment)

In the present embodiment, a SIM card is added to the configuration of the wireless communication device according to any of the above embodiments. For example, the SIM card is connected with MAC processor 10, MAC/PHY manager 60, or a controller in the wireless communication device. Thus, by adopting a configuration in which the SIM card is included in the wireless communication device, authentication processing can be easily performed.

(Ninth Embodiment)

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

(Tenth Embodiment)

In the present embodiment, an LED unit is added to the configuration of the wireless communication device according to any of the above embodiments. For example, the LED unit is connected to at least one of MAC processor 10, MAC/PHY manager 60, a transmission processing circuit, a reception processing circuit or a controller in the wireless communication device. Thus, by adopting a configuration in which the LED unit is included in the wireless communication device, notifying the operation state of the wireless communication device to the user can be easily done.

(Eleventh Embodiment)

In the present embodiment, a vibrator unit is included in addition to the configuration of the wireless communication device wireless communication device according to any of the above embodiments. For example, the vibrator unit is connected to at least one of MAC processor 10, MAC/PHY manager 60, a transmission processing circuit, a reception processing circuit or a controller in the wireless communication device. Thus, by adopting a configuration in which the vibrator unit is included in the wireless communication device, notifying the operation state of the wireless communication device to the user can be easily done.

(Twelfth Embodiment)

In the present embodiment, the configuration of the wireless communication device includes a display in addition to the configuration of the wireless communication device (the wireless communication device of the terminal (which may indicate the base station)) according to any one of the above embodiments. The display may be connected to the MAC processor in the wireless communication device via a bus (not shown). As seen from the above, the configuration including the display to display the operation state of the wireless communication device on the display allows the operation status of the wireless communication device to be easily notified to a user.

(Thirteenth Embodiment)

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are six types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error). RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 24:
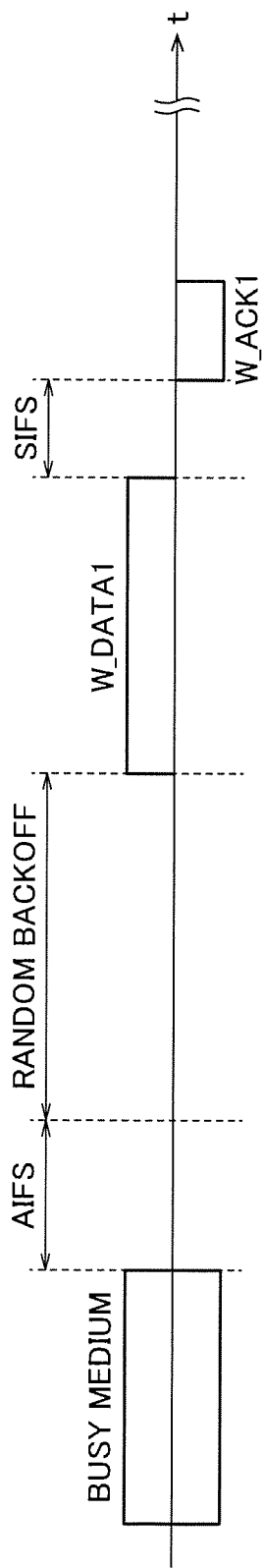
FIG. 24 is a diagram illustrating an example of exchange of frames during a contention period.

Here, FIG. 24 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 μs and the slot time is 9 μs, and thereby PIFS is 25 μs, DIFS is 34 μs, the default value of the frame interval of an access category of BACKGROUND (AC_BK) in AIFS is 79 μs, the default value of the frame interval of BEST EFFORT (AC_BE) is 43 μs, the default value of the frame interval between VIDEO(AC_VI) and VOICE(AC_VO) is 34 μs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

Note that the frames described in the embodiments may indicate not only things called frames in, for example, the IEEE 802.11 standard, but also things called packets, such as Null Data Packets. When it is expressed that the base station transmits or receives a plurality of frames or a plurality of X-th frames, the frames or the X-th frames may be the same (for example, the same type or the same content) or may be different. An arbitrary value can be put into X according to the situation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication device, comprising:
a receiver configured to receive a plurality of first frames each including first information required for generation of a trigger frame for uplink multi-user transmission; and
a transmitter configured to transmit a second frame generated on the basis of the first information included in the plurality of first frames, the second frame being the trigger frame and designating at least one target terminal for the uplink multi-user transmission, wherein
each of the first frames is transmitted by a respective one of terminals, and each of the terminals accesses a wireless medium using an access category associated with a first frame under CSMA/CA (Carrier Sense Multiple Access with Carrier Avoidance) to transmit the first frame,
the access category associated with the first frame is one of a plurality of access categories,
the second frame instructs the at least one target terminal to transmit third frames including data in elapse of a predetermined time after the second frame is received, and
the first information included in the plurality of first frames includes:
information indicating amounts of data in a plurality of buffers corresponding to the plurality of access categories; and
information indicating an access category having a highest transmission priority among the plurality of access categories for the uplink multi-user transmission wherein the access category having the highest transmission priority is an access category most desirable to transmit by each of the terminals and is one selected from the access categories by each of the terminals.

2. The wireless communication device according to claim 1, wherein
the multi-user transmission is at least one of frequency multiplexing transmission or spatial multiplexing transmission.

3. The wireless communication device according to claim 1, comprising a controller configured to determine at least one of a maximum length of the third frame or a maximum length of the data, and
the second frame includes information relating to the at least one of the maximum length of the third frame or the maximum length of the data.

4. The wireless communication device according to claim 1, comprising a controller configured to select a plurality of target terminals for the multi-user transmission from the terminals and determine an access category of the data to each of the plurality of target terminals and
the second frame includes information designating the access category determined for each of the plurality of target terminals.

5. The wireless communication device according to claim 4, wherein
the first information includes information relating to presence or non-presence of data for transmission for each of the plurality of access categories;
the controller is configured to select the plurality of target terminals from the terminals having data for transmission of a first access category of the plurality of access categories; and
the second frame includes information designating the first access category commonly for the plurality of target terminals.

6. The wireless communication device according to claim 4, wherein
the first information includes information relating to a data amount for transmission for each of the plurality of access categories;

the controller is configured to select the plurality of target terminals on the basis of the data amount for transmission of a first access category of the plurality of access categories; and the second frame includes information designating the first access category commonly for the plurality of target terminals.

7. The wireless communication device according to claim 4, wherein the first information includes information indicating priorities of transmission for a plurality of access categories;

the controller is configured to select the plurality of target terminals on the basis of the priority of a first access category of the plurality of access categories; and the second frame includes information designating the first access category commonly for the plurality of target terminals.

8. The wireless communication device according to claim 4, wherein the access category is an access category or a traffic ID defined by IEEE 802.11 standard.

9. The wireless communication device according to claim 1, comprising: a controller configured to select a plurality of target terminals for the multi-user transmission from the terminals wherein the second frame includes information designating the plurality of target terminals;

the first information includes information indicating a communication scheme of the multi-user transmission desired by the terminals; and the controller is further configured to select the plurality of target terminals from the terminals which have transmitted the first information indicating a first communication scheme.

10. The wireless communication device according to claim 1, comprising a controller configured to select a plurality of target terminals for the multi-user transmission from the terminals; and determine communication resources used by the plurality of target terminals in the multi-user transmission, wherein the second frame includes information designating the communication resources determined for the plurality of target terminals.

11. The wireless communication device according to claim 1, comprising a controller configured to select a plurality of candidate terminals for the multi-user transmission from the terminals on the basis of the first information included in the plurality of first frames wherein the transmitter is further configured to transmit a fourth frame for inquiring presence or non-presence of a request for the multi-user transmission to the plurality of candidate terminals.

12. The wireless communication device according to claim 11, wherein the controller is further configured to select a plurality of target terminals for the multi-user transmission from the candidate terminals which transmitted a fifth frame notifying that there is a request for the multi-user transmission in reply to the fourth frame.

13. The wireless communication device according to claim 1, further comprising at least one antenna.

14. A wireless communication terminal comprising:

at least one antenna;

a receiver coupled to the at least one antenna and receiving a frame;

a transmitter coupled to the at least one antenna and transmitting a frame;

a communication processor coupled to the receiver and the transmitter;

a network processor coupled to the communication processor, transmitting data to the communication processor and receiving data from another device; and a memory device coupled to the network processor and caching first data from the other device, wherein the receiver receives a plurality of first frames each including first information required for generation of a trigger frame for uplink multi-user transmission through the at least one antenna wherein each of the first frames is transmitted by a respective one of terminals, each of the terminals accesses a wireless medium using an access category associated with a first frame under CSMA/CA (Carrier Sense Multiple Access with Carrier Avoidance) to transmit the first frame, and the access category associated with the first frame is one of a plurality of access categories;

the transmitter is further configured to transmit a second frame through the at least one antenna, the second frame being generated on the basis of the first information included in the plurality of first frames and the first data cached in the memory device, the second frame being the trigger frame and designating at least one target terminal for the uplink multi-user transmission; and the second frame instructs the at least one target terminal to transmit third frames including data for the uplink multi-user transmissions in elapse of a predetermined time after the second frame is received, and the first information included in the plurality of first frames includes:

information indicating amounts of data in a plurality of buffers corresponding to the plurality of access categories; and information indicating an access category having a highest transmission priority among the plurality of access categories for the uplink multi-user transmission wherein the access category having the highest transmission priority is an access category most desirable to transmit by each of the terminals and is one selected from the access categories by each of the terminals.

15. The wireless communication terminal according to claim 14, wherein the multi-user transmission is at least one of frequency multiplexing transmission or spatial multiplexing transmission.

16. The wireless communication terminal according to claim 14, wherein the communication processor is configured to determine at least one of a maximum length of the third frame or a maximum length of the data; and the second frame includes information indicating the at least one of the maximum length of the third frame or the maximum length of the data through the at least one antenna.

17. The wireless communication terminal according to claim 14, wherein the communication processor is configured to select a plurality of target terminals for the multi-user transmission from the terminals and determines an access category of the data to each of the plurality of target terminals; and the second frame includes information designating the access category determined for each of the plurality of target terminals.

18. The wireless communication terminal according to claim 17, wherein
the first information includes information indicating presence or non-presence of data for transmission for each of the plurality of access categories;
the communication processor is configured to select the plurality of target terminals from ones of the terminals which have data for transmission of a first access category in the plurality of access categories; and
the second frame includes information designating the first access category commonly for the plurality of target terminals.

19. The wireless communication terminal according to claim 17, wherein
the first information includes information indicating a data amount for transmission for each of the plurality of access categories;
the communication processor is configured to select the plurality of target terminals on the basis of the data amount for transmission of a first access category of the plurality of access categories; and
the second frame includes information designating the first access category commonly for the plurality of target terminals.

20. A wireless communication method by a wireless communication terminal, comprising:
caching first data from another device in a memory device;
receiving a plurality of first frames each including first information required for generation of a trigger frame for uplink multi-user transmission wherein each of the first frames is transmitted by a respective one of terminals, each of the terminals accesses a wireless medium using an access category associated with a first frame under CSMA/CA (Carrier Sense Multiple Access with Carrier Avoidance) to transmit the first frame and the access category associated with the first frame is one of a plurality of access categories; and
transmitting a second frame, the second frame being generated on the basis of the first information included in the plurality of first frames and the first data cached in the memory device, the second frame being the trigger frame and designating at least one target terminal for the uplink multi-user transmission wherein
the second frame instructs the at least one target terminal to transmit third frames including data for the uplink multi-user transmission in elapse of a predetermined time after the second frame is received, and
the first information included in the plurality of first frames includes:
information indicating amounts of data in the plurality of buffers corresponding to the plurality of access categories; and
information indicating an access category having a highest transmission priority among the plurality of access categories for the uplink multi-user transmission wherein the access category having the highest transmission priority is an access category most desirable to transmit by each of the terminals and is one selected from the access categories by each of the terminals.

21. wireless communication device according to claim 1, comprising a controller configured to select the at least one target terminal from the terminals based on the first information included in the plurality of first frames, and
the receiver receives the third frames transmitted by multiuser multiplexing from the at least one target terminal in elapse of the predetermined time after the at least one target terminal receives the second frame.

22. The wireless communication device according to claim 1, wherein the access categories include BACKGROUND, BEST EFFORT, VIDEO, and VOICE.

* * * * *